US012578239B2

(12) United States Patent
Tadayon et al.

(10) Patent No.: US 12,578,239 B2
(45) Date of Patent: Mar. 17, 2026

(54) TEMPERATURE MEASUREMENT SYSTEM AND METHOD USING MULTIMODE OF AN OPTICAL RESONATOR

(71) Applicant: Fluke Corporation, Everett, WA (US)

(72) Inventors: Mohammad Amin Tadayon, Gaithersburg, MD (US); Robert B. Haines, Phoenix, AZ (US)

(73) Assignee: Fluke Corporation, Everett, WA (US)

( * ) Notice: Subject to any disclaimer, the term of this patent is extended or adjusted under 35 U.S.C. 154(b) by 417 days.

(21) Appl. No.: 18/186,801

(22) Filed: Mar. 20, 2023

(65) Prior Publication Data

US 2023/0304871 A1 Sep. 28, 2023

Related U.S. Application Data

(60) Provisional application No. 63/322,521, filed on Mar. 22, 2022.

(51) Int. Cl.
*G01K 11/32* (2021.01)
*G01K 11/00* (2006.01)
(52) U.S. Cl.
CPC .............. *G01K 11/32* (2013.01); *G01K 11/00* (2013.01)
(58) Field of Classification Search
CPC ................................. G01K 11/32; G01K 11/00
See application file for complete search history.

(56) References Cited

U.S. PATENT DOCUMENTS

| | | | | | |
|---|---|---|---|---|---|
| 4,515,430 A | * | 5/1985 | Johnson | ................... | G02B 6/30 |
| | | | | | 356/477 |
| 4,714,342 A | * | 12/1987 | Jackson | ................. | G01K 11/32 |
| | | | | | 374/161 |

(Continued)

FOREIGN PATENT DOCUMENTS

| | | |
|---|---|---|
| CN | 101825480 A | 9/2010 |
| EP | 1 469 292 A1 | 10/2004 |

(Continued)

OTHER PUBLICATIONS

International Search Report and Written Opinion for Application No. PCT/US2021/035757, mailing date Sep. 30, 2021, 16 pgs.

(Continued)

*Primary Examiner* — Laura Martin
*Assistant Examiner* — Philip L Cotey
(74) *Attorney, Agent, or Firm* — Seed Intellectual Property Law Group LLP

(57) ABSTRACT

A temperature measurement system includes an optical resonator, a detector, and a computing subsystem. Light resonates in the optical resonator at resonant wavelengths that vary relative to a temperature in the optical resonator. The detector detects at least two resonant wavelengths of light output from the optical resonator. The computing subsystem determines the temperature of the optical resonator based at least in part on a mathematical operation on the at least two resonant wavelengths of the light output from the optical resonator. The mathematical operation may be a subtraction operation that determines a wavelength difference between two resonant wavelengths. In various implementations, the temperature of the optical resonator is determined based on a mapping of the wavelength difference to the temperature or based on an identified mode of the (Continued)

optical resonator and a mapping of the resonant wavelength to the temperature of the optical resonator in the mode.

20 Claims, 6 Drawing Sheets

(56)                    References Cited

U.S. PATENT DOCUMENTS

| | | | | |
|---|---|---|---|---|
| 4,974,961 | A | 12/1990 | Jackson et al. | |
| 5,317,524 | A * | 5/1994 | Das | G01D 5/268 |
| | | | | 250/227.21 |
| 6,243,506 | B1 * | 6/2001 | Wu | G01K 11/00 |
| | | | | 385/12 |
| 7,085,452 | B1 * | 8/2006 | Lin | G02B 6/4215 |
| | | | | 374/E11.015 |
| 7,327,472 | B2 * | 2/2008 | Riza | G01K 5/52 |
| | | | | 356/519 |
| 7,796,262 | B1 * | 9/2010 | Wang | G01N 33/54393 |
| | | | | 356/441 |
| 8,096,704 | B2 * | 1/2012 | Riza | G01J 5/0896 |
| | | | | 374/161 |
| 8,625,936 | B1 * | 1/2014 | Dong | G02F 1/2257 |
| | | | | 385/32 |
| 9,726,553 | B2 | 8/2017 | Ahmed et al. | |
| 9,891,112 | B1 * | 2/2018 | Abel | G01J 5/084 |
| 10,056,733 | B1 * | 8/2018 | Taylor | H01S 5/0687 |
| 10,527,784 | B1 * | 1/2020 | Koste | G02B 6/124 |
| 10,900,838 | B1 * | 1/2021 | Podmore | G01J 3/1895 |
| 10,955,617 | B2 | 3/2021 | Klimov et al. | |
| 2003/0085344 | A1 * | 5/2003 | Shu | G02B 6/022 |
| | | | | 374/E11.015 |
| 2003/0118075 | A1 * | 6/2003 | Schweiger | G01K 11/3206 |
| | | | | 374/161 |
| 2005/0213869 | A1 * | 9/2005 | Brown | G01D 5/35364 |
| | | | | 374/E11.015 |
| 2006/0017932 | A1 * | 1/2006 | Riza | G01J 5/60 |
| | | | | 374/E5.034 |
| 2010/0290055 | A1 * | 11/2010 | Kim | G01N 21/21 |
| | | | | 356/453 |
| 2012/0057866 | A1 * | 3/2012 | McLaren | G02B 6/12007 |
| | | | | 359/276 |
| 2013/0194578 | A1 | 8/2013 | Niskanen et al. | |
| 2013/0294465 | A1 * | 11/2013 | Chang | H01S 3/108 |
| | | | | 372/10 |
| 2014/0003761 | A1 * | 1/2014 | Dong | G02F 1/2257 |
| | | | | 385/2 |
| 2014/0321502 | A1 * | 10/2014 | Ahmed | G01K 11/00 |
| | | | | 374/130 |
| 2016/0047677 | A1 * | 2/2016 | Heidrich | G01N 21/7746 |
| | | | | 356/480 |
| 2016/0109302 | A1 * | 4/2016 | Ritcher | G01K 7/245 |
| | | | | 374/152 |
| 2016/0305984 | A1 * | 10/2016 | Bohnert | G01R 15/247 |
| 2017/0153387 | A1 * | 6/2017 | Wei | G01B 11/2441 |
| 2017/0276870 | A1 * | 9/2017 | Snyman | G01P 5/20 |
| 2018/0164236 | A1 * | 6/2018 | Tao | G01N 21/63 |
| 2018/0212682 | A1 * | 7/2018 | Chen | H04B 10/50572 |
| 2019/0011253 | A1 * | 1/2019 | Ding | G02B 6/2935 |
| 2021/0018431 | A1 * | 1/2021 | Viegas | G01K 11/32 |
| 2021/0164853 | A1 * | 6/2021 | Vez | G01B 9/02007 |
| 2021/0172833 | A1 * | 6/2021 | Ahmed | G02B 1/005 |
| 2021/0231526 | A1 * | 7/2021 | Seeley | G01B 11/18 |
| 2021/0278289 | A1 * | 9/2021 | Nasilowski | G01K 11/32 |
| 2021/0333089 | A1 * | 10/2021 | Han | G01B 9/02003 |
| 2021/0381906 | A1 | 12/2021 | Tadayon et al. | |
| 2021/0381908 | A1 | 12/2021 | Tadayon et al. | |

FOREIGN PATENT DOCUMENTS

| | | |
|---|---|---|
| EP | 2 735 862 A1 | 5/2014 |
| JP | 57-190239 A | 11/1982 |
| JP | 2013-543112 A | 11/2013 |
| JP | 2021-12902 A | 2/2021 |
| KR | 10-2015-0013894 A | 2/2015 |
| KR | 10-2022-0008606 A | 1/2022 |
| WO | 84/04385 A1 | 11/1984 |
| WO | 2008/018900 A2 | 2/2008 |
| WO | 2021/156731 A1 | 8/2021 |

OTHER PUBLICATIONS

International Search Report and Written Opinion of the International Searching Authority for Application No. PCT/US2022/082640, mailing date Apr. 11, 2023, 12 pages.

U.S. Appl. No. 17/338,454, filed Jun. 3, 2021.

U.S. Appl. No. 17/338,313, filed Jun. 3, 2021.

International Search Report and Written Opinion for Application No. PCT/US2021/035767, mailing date Sep. 28, 2021, 14 pgs.

Xu, H. et al., "Ultra-sensitive chip-based photonic temperature sensor using ring resonator structures", Optics Express, 22(3), 3098-3104, 2014, 7 pages.

Klimov, N. N. et al., "On-Chip Silicon Waveguide Bragg Grating Photonic Temperature Sensor", Optics Letters, 40(17), 3934-3936, 2015, 4 pages.

Klimov, N. et al., "Towards Replacing Resistance Thermometry with Photonic Thermometry", Sensors and Actuators A: Physical, 269, 308-312, 2018, 7 pages.

Paschotta, R., "Free Spectral Range", RP Photonics Encyclopedia, https://www.rp-photonics.com/free_spectral_range.html, downloaded Mar. 20, 2023, 4 pages.

Paschotta, R., "Resonator Modes", RP Photonics Encyclopedia, https://www.rp-photonics.com/resonator_modes.html, downloaded Mar. 20, 2023, 8 pages.

* cited by examiner

_900_

_902_

DETECTING AT LEAST TWO RESONANT
WAVELENGTHS OF AN OPTICAL RESONATOR
BY DETECTING AT LEAST TWO PEAKS
IN OPTICAL INTENSITY OR POWER OF LIGHT
OUTPUT FROM THE OPTICAL RESONATOR

_904_

DETERMINING A TEMPERATURE MEASUREMENT
BASED AT LEAST IN PART ON A
MATHEMATICAL OPERATION ON THE AT LEAST
TWO RESONANT WAVELENGTHS

TEMPERATURE MEASUREMENT SYSTEM AND METHOD USING MULTIMODE OF AN OPTICAL RESONATOR

BACKGROUND

Technical Field

The present disclosure relates to temperature measurement, and in particular, to temperature measurement systems and methods that use a photonic device such as an optical resonator.

Description of the Related Art

The ability to measure temperature is an important part of many technological endeavors, for example in manufacturing process control, medical and physiological monitoring, environmental controls, etc. Cost, stability, and accuracy are major considerations in thermometry. Resistance thermometers that use measurements of resistance of a thin metal film or wire, e.g., platinum resistance thermometers, are known and can produce accurate temperature measurements. However, resistance thermometers are typically sensitive to environmental variables such as humidity, material degradation, and mechanical shock which causes the resistance to drift over time, requiring frequent, expensive, and time consuming calibration.

Photonic thermometry has been discovered as an alternative to resistance thermometry. Photonic thermometers rely on temperature dependent changes in an optical material, typically a combination of thermo-optic effects and thermal expansion, which cause detectable changes in light traversing the optical material. Photonic thermometers have the potential to provide greater temperature sensitivity while being less susceptible to environmental variables as noted above.

In some systems, a photonic device having an optical resonator is coupled to a tunable light source that provides input light to the photonic device across a wide range of wavelengths, e.g., a tunable laser that produces light across a range of 60 nm or more. A wavelength meter may receive and detect a resonant wavelength in the light that is output from the photonic device, and from the detected resonant wavelength determine the temperature in the photonic device. However, a wide range tunable light source can be very expensive, bulky, and sensitive to environmental factors. Recalibration of the system may be required to ensure accurate temperature measurements over time. Significant scientific training and knowledge may also be needed to operate such systems.

BRIEF SUMMARY

Aspects of the present disclosure provide highly accurate temperature measurement systems using a photonic device. In various embodiments, the temperature measurement systems use an optical resonator in which light resonates at different resonant wavelengths (or frequencies) according to the temperature in the optical resonator. The temperature measurement systems further include a readout system, typically comprised of a detector and a computing subsystem, that detects one or more resonant wavelengths of the optical resonator. At any given temperature, light traversing the optical resonator will resonate at different wavelengths in different modes of the optical resonator.

In some embodiments, the computing subsystem identifies a mode of the optical resonator based on a first temperature indication in or proximate to the optical resonator. A temperature indication in or proximate to the optical resonator is an indication of temperature inside or near the optical resonator. The first temperature indication may be a rough first temperature measurement in a first temperature accuracy range. An accuracy range in this regard is a range of temperatures around the actual temperature in which the temperature indication is "close enough" and considered satisfactory as an indication of the actual temperature. The mode of the optical resonator may be identified using the first temperature indication and a function, such as an equation or look-up table, that correlates temperatures in or proximate to the optical resonator with respective modes of the optical resonator.

Based on the identified mode of the optical resonator, the computing subsystem obtains a characteristic relationship that correlates a range of resonant wavelengths of the optical resonator with a range of temperatures in the optical resonator in the identified mode. A characteristic relationship as described herein may be represented in a number of ways. In at least one example, a characteristic relationship may be represented as a mathematical function or equation that defines a characteristic curve. The characteristic curve correlates resonant wavelengths of the optical resonator with temperatures in the optical resonator. In another example, a characteristic relationship may be represented as a look-up table that correlates resonant wavelengths of the optical resonator with temperatures in the optical resonator.

Using a detected resonant wavelength of the optical resonator and the obtained characteristic relationship, the computing subsystem determines a more-accurate second temperature indication in the optical resonator in a second temperature accuracy range. The second temperature accuracy range is a range of temperatures around the actual temperature that is narrower than the range of temperatures in the first temperature accuracy range. In other words, the second temperature accuracy range of the second temperature indication has a smaller tolerance around the actual temperature, and thus the second temperature indication provides a more-accurate indication of the actual temperature (i.e., has greater accuracy) than the first temperature indication.

Advantageously, temperature measurement systems as described herein can be constructed to use a less complex and less expensive light source that outputs light to the optical resonator in a limited, short range of wavelengths. The light source may, for example, be a tunable laser that outputs light in a short range of wavelengths such as (but not limited to) a maximum range of 4 nm to 10 nm. The short range of wavelengths output by the light source may provide light in which at least one resonant wavelength is detected for a given temperature in the optical resonator, or a range in which a few resonant wavelengths, e.g., two, three, or four resonant wavelengths, are detected.

In various embodiments, a method for temperature measurement may include detecting a resonant wavelength of an optical resonator, identifying a mode of the optical resonator based on a first temperature indication in or proximate to the optical resonator in a first temperature accuracy range, and determining, based on the mode of the optical resonator and the resonant wavelength of the optical resonator, a second temperature indication in the optical resonator in a second temperature accuracy range having greater accuracy than the first temperature accuracy range.

A first temperature indication in or proximate to the optical resonator may be obtained using a less accurate, and generally less expensive, temperature measurement device. Using the first temperature indication and known resonant characteristics of the optical resonator, the mode(s) of the optical resonator at which light is resonating in the optical resonator may be identified. The mode of the optical resonator may be identified, for example, using the first temperature indication and a function, such as an equation or look-up table, that correlates temperatures in or proximate to the optical resonator with respective modes of the optical resonator.

Knowing the particular mode(s) of the optical resonator at which light is resonating allows retrieval of a predetermined characteristic relationship for one or more particular modes. A predetermined characteristic relationship for each mode indicates a range of resonant wavelengths of the optical resonator relative to a range of temperatures in the optical resonator. Using the detected resonant wavelength(s) of the optical resonator and the obtained characteristic relationship(s), a more-accurate indication of temperature in the optical resonator is determined.

Another method for temperature measurement may include detecting at least two resonant wavelengths of an optical resonator, and determining a temperature measurement based at least in part on a mathematical operation on the at least two resonant wavelengths and a mapping of an output of the mathematical operation to a temperature in the optical resonator. For example, in some cases, the mathematical operation is a subtraction operation that determines a wavelength difference between two resonant wavelengths of the at least two resonant wavelengths. In some cases, one or more modes of the optical resonator are identified based on the determined wavelength difference. An accurate temperature indication of the optical resonator is determined using the identified resonant mode or modes and corresponding characteristic relationship(s) that map a range of resonant wavelengths to a range of temperatures in the optical resonator in the respective mode or modes. As mentioned earlier, the characteristic relationship may be an equation or function or look-up table, for example, that correlates a range of resonant wavelengths to a range of temperatures in the optical resonator. In other cases, a resonant mode of the optical resonator is not identified, but the determined wavelength difference itself is mapped to the temperature in the optical resonator.

A highly accurate temperature measurement can thus be achieved using a simpler (and typically lower cost) light source having a smaller output wavelength range as compared to alternative thermometers that require a more complex, expensive, wide-range tunable light source in order to track the resonance of a single mode of an optical resonator across a wide temperature range.

DETAILED DESCRIPTION

Figure 1A:
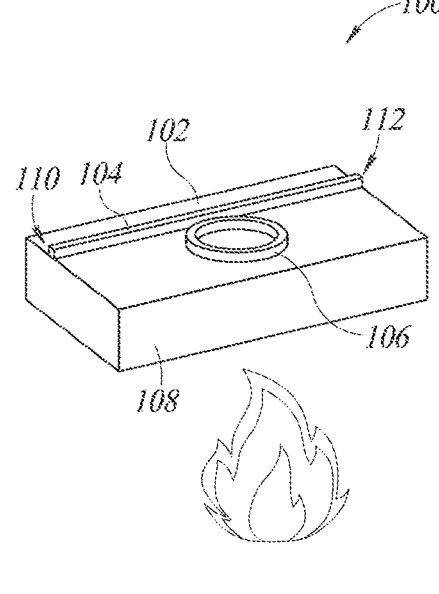
FIG. 1A is a pictorial diagram illustrating a system including a photonic device that is usable for temperature measurement.

Systems and methods described herein provide a less complex and generally less costly photonic temperature measurement system that still achieves a highly accurate temperature measurement. In contrast to existing photonic temperature measurement systems that require a more complex, expensive, wide-range tunable light source to enable the system to track the resonance of a single mode of an optical resonator across a wide temperature range, embodiments of the present disclosure use a simpler and typically less expensive light source that is not tunable across a wide range of wavelengths, but rather produces light in a smaller range of wavelengths.

In at least some embodiments, a temperature measurement system of the present disclosure determines the mode of an optical resonator at which light is resonating in the optical resonator. The mode of the optical resonator may be determined from an observed characteristic of the optical resonator and a mapping of the observed characteristic to the mode of the optical resonator. In such embodiments, determining the mode of the optical resonator allows a more accurate temperature measurement to be determined from a known relationship between resonant wavelengths of the optical resonator and temperatures in the optical resonator, for the determined mode.

In some cases, the observed characteristic of the optical resonator is a first, less-accurate temperature measurement of the optical resonator obtained from a less expensive thermometer or temperature measurement device. Having a first, less-accurate temperature measurement (which may be an estimated or rough temperature measurement) of the optical resonator allows for identification of the mode of the optical resonator that corresponds with, or is expected to correspond with, a resonant wavelength of the optical resonator. Thereafter, the resonant wavelength of the optical resonator, as detected by a detector, can be used to obtain a more-accurate temperature measurement of the optical resonator based on a predetermined correspondence between the resonant wavelength and the temperature in the optical resonator, for the identified mode of the optical resonator. This predetermined correspondence may be embodied as a characteristic relationship that maps a range of resonant wavelengths to a range of temperatures in the optical resonator for the identified mode.

In some cases, the observed characteristic of the optical resonator may be a difference in wavelength between two detected resonant wavelengths of the optical resonator. The difference in wavelength between two detected resonant wavelengths is unique to the respective modes of the optical resonator in which the detected resonant wavelengths are produced. Thus, a known difference in wavelength between two detected resonant wavelengths allows for identification of one or more modes of the optical resonator corresponding to the detected resonant wavelengths. Once one or more modes are identified, a predetermined correspondence between a detected resonant wavelength and the temperature in the optical resonator for the respective mode can be used to determine an accurate temperature measurement of the optical resonator. Again, this predetermined correspondence may be embodied in a characteristic relationship that maps a range of resonant wavelengths to a range of temperatures in the optical resonator for the particular mode.

In some cases, the determined wavelength difference itself may be mapped to the temperature in the optical resonator. Thus, a temperature measurement may be determined by detecting at least two resonant wavelengths of the optical resonator, calculating a wavelength difference between two resonant wavelengths of the at least two resonant wavelengths, and then determining the temperature in the optical resonator from a predetermined mapping of the wavelength difference to the temperature in the optical resonator. In some cases, the mapping used to determine the temperature measurement uses one or both of at least two detected resonant wavelengths and the determined wavelength difference to determine the temperature in the optical resonator.

It should be understood throughout the following description and claims that references to wavelength may be substituted for references to frequency, and vice versa. Frequency and wavelength are characteristics whose values are merely inversely proportional to each other. Additionally, it should be understood that references to a characteristic relationship may refer to a mathematical function or equation that correlates a range of resonant wavelengths of the optical resonator with a range of temperatures in the optical resonator, in the identified mode. A characteristic relationship may also refer to a look-up table that correlates resonant wavelengths of the optical resonator with temperatures in the optical resonator.

FIG. 1A depicts at least one embodiment of a photonic system 100 including a photonic device 102 that may be used, for example, in a temperature measurement system. As will be described herein, a temperature measurement system of the present disclosure achieves an accurate temperature measurement with less complexity and generally lower cost than prior art photonic thermometers.

In FIG. 1A, the photonic device 102 includes a substrate 108 having a waveguide 104 and an optical resonator 106 positioned proximate to the waveguide 104. The waveguide 104 provides a conduit for light to be communicated through the photonic device 102, from a first port 110 to a second port 112. The substrate 108 supports the waveguide 104 and the optical resonator 106 in a fixed spatial relationship. The optical resonator 106 shown in FIG. 1A is a ring resonator, though the technical advantages of the present disclosure can be achieved with other types of optical resonators including, for example, a Fabry-Perot resonator, a microtoroid resonator, a photonic crystal, etc.

The photonic device 102 is useable to measure temperature based on a detected resonant wavelength of light resonating in the optical resonator 106. The resonant wavelength of the optical resonator 106 varies according to the temperature in the optical resonator due to thermo-optic effects that are temperature dependent, such as a refractive index of the material forming the optical resonator 106.

The substrate 108, the waveguide 104, and the optical resonator 106 may be formed of one or more materials having optically transparent properties such that, by virtue of the proximity of the optical resonator 106 to the waveguide 104, at least a portion of the light traversing the waveguide 104 enters into the optical resonator 106 via internal reflection of the light in the waveguide 104. Similarly, light that has resonated in the optical resonator 106 may couple back into the waveguide 104.

The substrate 108, the waveguide 104, and the optical resonator 106 may, for instance, be formed of a material that includes silicon, such as silicon, silicon dioxide, a silicate (e.g., borosilicate glass, lead glass, aluminum silicate), carbonate (e.g., sodium carbonate), glass-ceramics, amorphous metal, or silica-free glasses, by way of non-limiting examples. In other cases, the substrate 108, the waveguide 104, and the optical resonator 106 may be formed of other suitable materials based on a desired application or properties of the photonic device 102. The photonic device 102, including the waveguide 104, the optical resonator 106, and the substrate 108 may be formed using various fabrication methods, such as lithography methods (e.g., photolithography, e-beam lithography, embossing, direct pattern writing, 3D printing), film deposition, film growth, and film etching, by way of non-limiting example.

Figure 3:
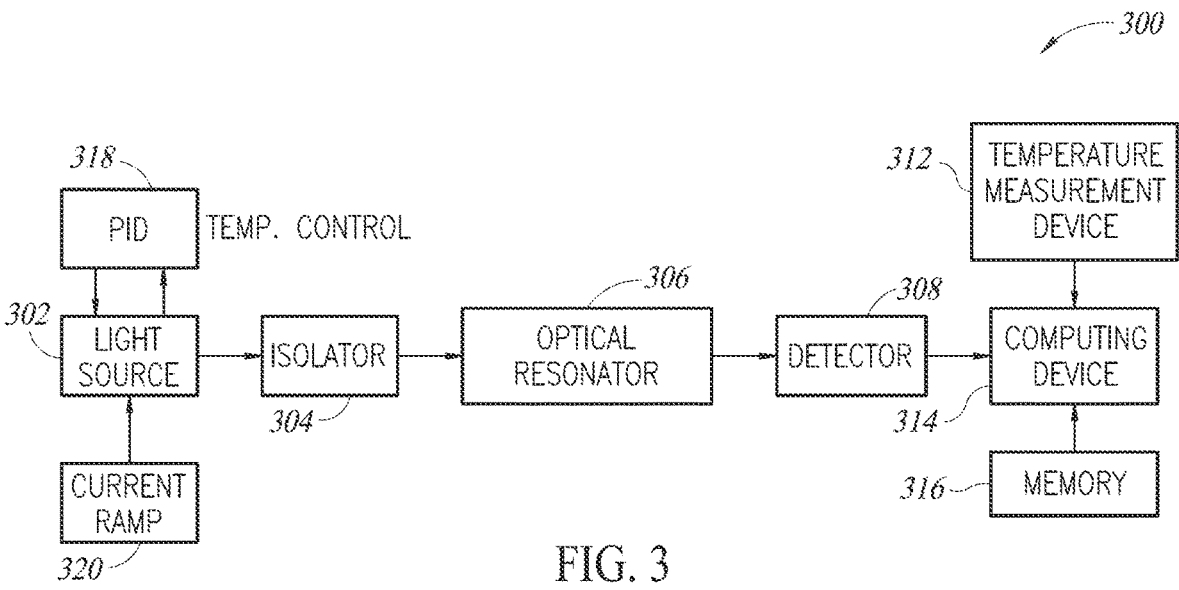
FIG. 3 is a block diagram illustrating one example of a temperature measurement system in accordance with the present disclosure.

In FIG. 1A, the optical resonator 106 is optically coupled to the waveguide 104. At least a portion of the light that traverses the waveguide 104 passes into the optical resonator 106. As light traveling within the optical resonator 106 resonates, the light is cycling and partly absorbed inside the optical resonator and the remainder of the light is coupled back into the waveguide 104. The light travels through the remainder of the waveguide 104 in superposition with original light communicated into the first port 110. The superposition of the remainder of the light from the optical resonator 106 and the original light is thereafter emitted from the second port 112 of the waveguide 104 to a readout system, e.g., a detector and computing device as illustrated in FIG. 3. In some cases, the optical resonator 106 may include more than one waveguide. Thus, while FIG. 1A illustrates a ring resonator with a single waveguide 104 proximate thereto, the ring resonator could be positioned proximate to two or more waveguides, e.g., a first waveguide with input and through ports, and a second waveguide with add and drop ports. Light that is input through the input port of the first waveguide may couple into and cycle in the ring resonator, and a remainder of the light in the ring resonator may thereafter couple to the second waveguide which carries the remainder of the light to a drop port.

While FIG. 3 illustrates the waveguide 104 and the optical resonator 106 as distinct elements of the photonic device 102, the term "optical resonator" also more generally refers to the combination of the waveguide 104 and the optical resonator 106, wherein light is directed from a light source to the (generally stated) optical resonator, and light output from the optical resonator is directed to a detector that can detect the resonance of light in the optical resonator.

Figure 1B:
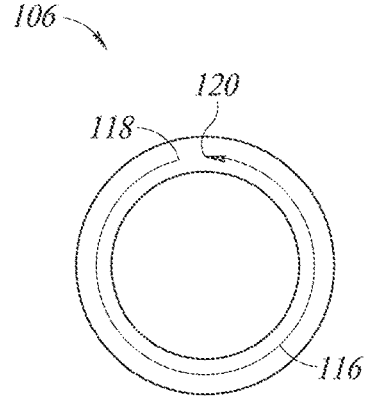
FIG. 1B is a pictorial diagram illustrating a light path of an optical resonator of a photonic device such as shown in FIG. 1A.

FIG. 1B schematically illustrates a light path 116 of an optical resonator, such as the optical resonator 106 in FIG. 1A. In this example, the optical resonator 106 has ring shape or an annular or toroidal shape. The light path 116 extends in a circumferential direction through a cross-sectional center of the optical resonator 106. In operation, original light coupled into the optical resonator 106 enters the optical resonator 106 at a first point 118, and is internally reflected between internal surfaces of the optical resonator 106 along the effective light path 116. The direction of travel of the light in the optical resonator 106 may be clockwise or counter-clockwise depending on the particular implementation. The light in the optical resonator 106, or a portion thereof, exits the optical resonator 106 at a second point 120 and is coupled back into the waveguide 104. Depending on the implementation, there may be different first points 118 and second points 120 at which rays of light are respectively coupled into and out of the optical resonator 106.

Figure 2A:
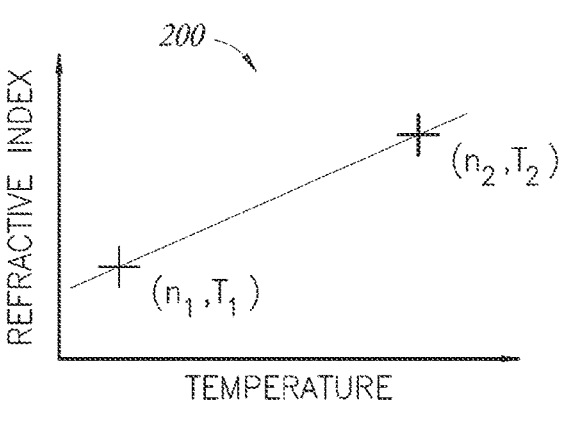
FIG. 2A is a diagram illustrating a relationship between refractive index and temperature in a photonic device such as shown in FIG. 1A.

FIG. 2A shows an example diagram 200 depicting a relationship between a refractive index of material forming the optical resonator 106 and a temperature in the optical resonator 106. In this example, the diagram 200 depicts a relationship between a refractive index, $n_i$, and temperature, $T_i$, of an optical resonator 106 formed of silicon. At a temperature $T_1$, the material has a refractive index of $n_1$, and at a different temperature $T_2$, the material has a different refractive index $n_2$. In FIG. 2A, the change in the refractive index n of the material forming the optical resonator 106 is directly proportional to the change in temperature T of the optical resonator 106. In the example shown, the refractive index n of the material forming the optical resonator 106 changes linearly relative to the temperature T of the optical resonator 106, though in other implementations, the relationship of the refractive index and the temperature may be nonlinear.

In various embodiments, the optical resonator 106 may be constructed of different materials having different optical properties, including a different refractive index n with different characteristics that change according to changes in the temperature of the material in the optical resonator 106. As a result of change in temperature T of the optical resonator 106 and a consequent change in the refractive index n of the material forming the optical resonator 106, an effective length of the light path 116 in the optical resonator 106 may change. For example, the effective length of the light path 116 may change according to the following equation:

$$L_{eff}(T) = n_{eff}(T)L$$

where L is the length of the light path 116, $L_{eff}$ is the effective length of the light path 116, T is the temperature of the substrate 108, and $n_{eff}$ is the effective refractive index of the substrate 108 at the temperature T. The change in the effective length $L_{eff}$ causes a corresponding change in one or more characteristics of the light traveling in the optical resonator 106 that is coupled back to the waveguide 104, toward the second port 112 of the photonic device 102.

Figure 2B:
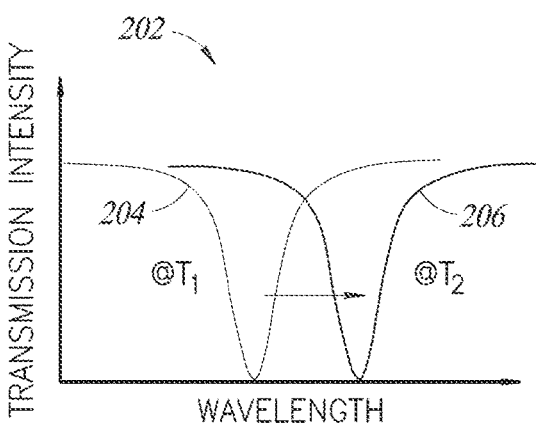
FIG. 2B is a diagram illustrating a change in characteristics of light traversing a photonic device, such as shown in FIG. 1A, as a result of a change of temperature in the photonic device.

FIG. 2B shows an example diagram 202 depicting a change in a characteristic of the light emitted from the second port 112 as a result of a change in temperature in the optical resonator 106. For instance, the optical intensity or power of the light emitted from the second port 112 (which is a superposition of the modified light from the optical resonator 106 and original light introduced into the waveguide 104) may have a first profile 204 relative to wavelengths of the original light at a first temperature $T_1$, and a second profile 206 relative to wavelength of the original light at a second temperature $T_2$. The first profile 204 and the second profile 206 depict a shift in resonant wavelength of the light in the optical resonator 106 that depends on the temperature in the optical resonator 106.

A resonant wavelength of the optical resonator 106 depends on the mode of the optical resonator 106. In the example shown in FIG. 2B, the resonant wavelength of the optical resonator 106 may be calculated using the following equation:

$$\lambda_1 = \frac{n_1 l_1}{m_1}$$

where $l_1$ is the length of the optical resonator, $n_1$ is the refractive index of the optical resonator, and $m_1$ is the mode of the optical resonator.

As can be seen in FIG. 2B, the slope of the curve indicating the resonance of the optical resonator 106 changes with respect to temperature. In particular, the slope of the curve indicating the resonant wavelength of the optical resonator 106 relative to the temperature T may be represented by the following equation:

$$\frac{d\lambda_1}{dT} = \frac{l_1}{m_1}\frac{dn_1}{dT}$$

where $d\lambda/dT$ is a change in wavelength relative to change in temperature in the optical resonator, $dn/dT$ is the change in refractive index relative to change in temperature in the optical resonator, $l_1$ is the length of the optical resonator, and $m_1$ is the mode number of the optical resonator.

Figure 4A:
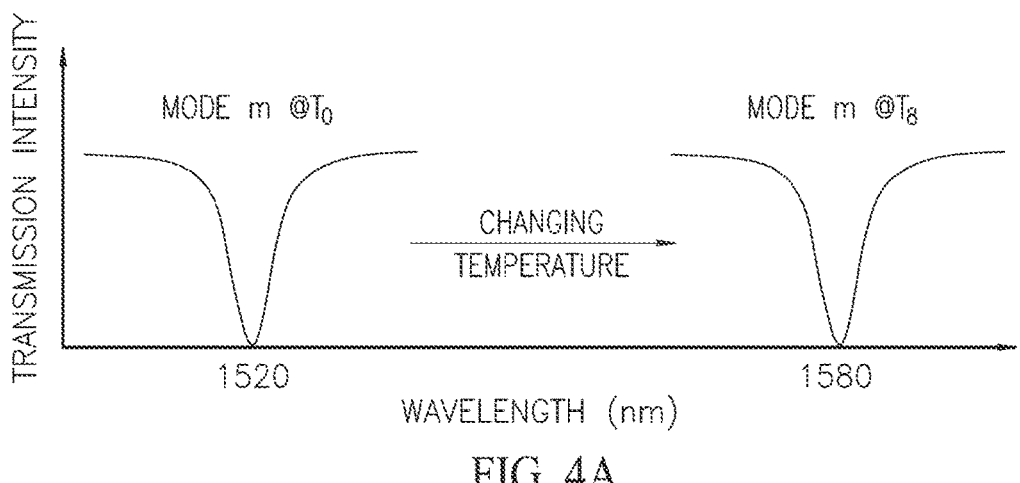
FIG. 4A is a graph illustrating an example in which, as the temperature in an optical resonator varies over a wide range of temperatures, the resonant wavelength of a particular mode of the optical resonator varies over a wide range of wavelengths.

Existing temperature measurement systems employing a photonic device are coupled to a tunable light source that provides input light to the photonic device across a wide range of wavelengths. The tunable light source may be a wide range tunable laser capable of producing light across a range of 60 nm or more. A wide range of wavelengths is needed to allow a resonant wavelength in a particular mode of the photonic device to be tracked across a wide range of temperatures. For example, turning to the graph in FIG. 4A, as the temperature in an optical resonator varies from temperature $T_0$ to $T_8$, the resonant wavelength of the optical resonator in mode m of the optical resonator varies over a wide range of wavelengths, e.g., from 1520 nm to 1580 nm. If, instead of mode m, the temperature measurement system tracked the resonant wavelength of mode m+7 of the optical resonator (not illustrated in FIG. 4A), the resonant wavelength may vary over a similar, but shifted, wide range of wavelengths, e.g., from 1465 nm (at $T_0$) to 1520 nm (at $T_8$).

In such existing temperature measurement systems, a wavelength meter may receive and analyze the light that is output from the photonic device across the wide range of wavelengths and detect a resonant wavelength thereof, and from the detected resonant wavelength determine the temperature in the photonic device. However, a wide range input light source, such as a wide range tunable laser having a tunability range of 60 nm or more, can be very expensive. In addition to high cost, lasers with a tunable range of 60 nm or more are bulky and sensitive to environmental vibrations. They occupy significant amount of space in a laboratory and require mechanical isolators. Recalibration of the system may be required to ensure accurate temperature measurements over time. Also, significant training and scientific knowledge may be necessary for persons using such temperature measurement systems, which increases the cost and complexity associated with operating such systems.

Instead of using a wide range tunable light source as currently employed, improved temperature measurement systems and methods according to the present disclosure use a light source that produces light over a short range, which can significantly decrease the complexity and cost of the temperature measurement system. At the same time however, the temperature measurement systems and methods described herein still achieve accurate temperature measurements over a wide range of temperatures. The arrangement of components and operational steps for measuring temperature according to the present disclosure provides for detection of a resonant wavelength of an optical resonator within a short range of wavelengths of input light while still producing an accurate determination of temperature in the optical resonator. This is achieved by taking advantage of different modes of the optical resonator in which light will resonate at wavelengths within the short range of wavelengths of the input light.

FIG. 3 illustrates one example of a temperature measurement system 300 constructed in accordance with principles of the present disclosure. In this example, components of the temperature measurement system 300 include a light source 302, an isolator 304, an optical resonator 306, a detector 308, a temperature measurement device 312, a computing device 314, and a memory 316. In this example, the temperature measurement system 300 also uses temperature controller 318 (which, in some embodiments, may be a proportional-integral-derivative (PID) controller) and a current ramp 320 to control operation of the light source (e.g., short range tunable laser) 302 to emit light having a wavelength that, over a period of time, changes or scans across a short range of wavelengths such as, for example, a 4 nm range from 1520 nm to 1524 nm.

In this example, the temperature controller 318 controls the temperature of the light source 302. The current ramp 320 (and/or possibly the temperature controller 318) controls the light emitted by the light source 302 and causes the emitted light to change wavelength over a short range of wavelengths. Under control of the current ramp 320 in this example, the light source 302 emits light at increasing or decreasing wavelengths. In some implementations, the light source 302 is controlled by the current ramp 320 so as to emit light across the short range of wavelengths at a relatively constant rate of change of wavelength.

The isolator 304 is an optional component that receives and isolates the light emitted by the light source 302. The optical isolator 304 permits one-way transmission of light from the light source 302 to the optical resonator 306. In operation, the optical isolator 304 prevents unwanted feedback of light into the components of the light source 302. In some implementations, for example, the optical isolator 304 may be constructed using known components such as a Faraday rotator, and may be polarization dependent or independent.

The detector 308 may be a photodetector configured receive light from the optical resonator 306 and output an electric signal to the computing device 314 based on a detected optical intensity or power of the light that is received from the optical resonator 306. The computing device 314 is programmed to evaluate the electric signal to assess the resonance of the optical resonator at different wavelengths of light. In some cases, the computing device 314 is programmed to determine the wavelength at which the optical intensity or power of the light from the optical resonator 306 peaks, thus indicating a peak resonance (or resonant wavelength) of the light in the optical resonator 306. In some cases, other ways for determining the resonance of the optical resonator 306 may be used (e.g. using components that provide laser frequency locking). In some cases, the computing device 314 is programmed to detect at least two peaks in the optical intensity or power of the light from the optical resonator 306 peaks, and thus determine at least two (or more) resonant wavelengths of the light in the optical resonator 306.

In the embodiment illustrated in FIG. 3, the computing device 314 is communicatively coupled to a temperature measurement device 312 that provides a coarse or rough temperature measurement of the optical resonator 306 in a first, lower accuracy temperature measurement range. In other words, the first temperature accuracy range has a wider tolerance around the actual temperature in the optical resonator 306. The temperature measurement device 312 may be a thermocouple or an interferometer, for example, that outputs a signal to the computing device dependent on the temperature in the optical resonator 306.

In some embodiments, the temperature measurement device 312 may be constructed on the same chip as the optical resonator 306, or even be constructed using the same optical resonator 306. In other embodiments, the temperature measurement device 312 may be separate from but thermally coupled to the optical resonator 306 or to the substrate that supports the optical resonator 306. In embodiments that use an interferometer as a temperature measurement device 312, light output from the interferometer may be directed a photodetector (different from or the same as the photodetector forming the detector 308), which outputs an electric signal to the computing device 314 relative to the optical intensity or power of the light output from the interferometer. The computing device 314 may use the output from the photodetector to determine a rough temperature measurement of the optical resonator 306. Examples of temperature measurement systems that suitably implement an interferometer as a temperature measurement device are described in U.S. Application No. 63/034,063, filed Jun. 3, 2020, and corresponding non-provisional U.S. application Ser. No. 17/338,454, filed Jun. 3, 2021, and published as U.S. Pre-Grant Publication No. 2021/0381908, the teachings of which are expressly incorporated herein by reference.

Having a rough temperature measurement allows the computing device 314 to properly correlate a detected resonant wavelength of the optical resonator 306 with the temperature in the optical resonator 306. In particular, the rough temperature measurement provides a reference temperature or temperature range that guides an accurate correlation of a detected resonant wavelength of the optical resonator 306 with the temperature in the optical resonator

306. For instance, a rough temperature measurement provided by the temperature measurement device 312 helps the computing device 314 determine the mode of the optical resonator 306 in which light is resonating in the optical resonator 306.

Figure 4B:
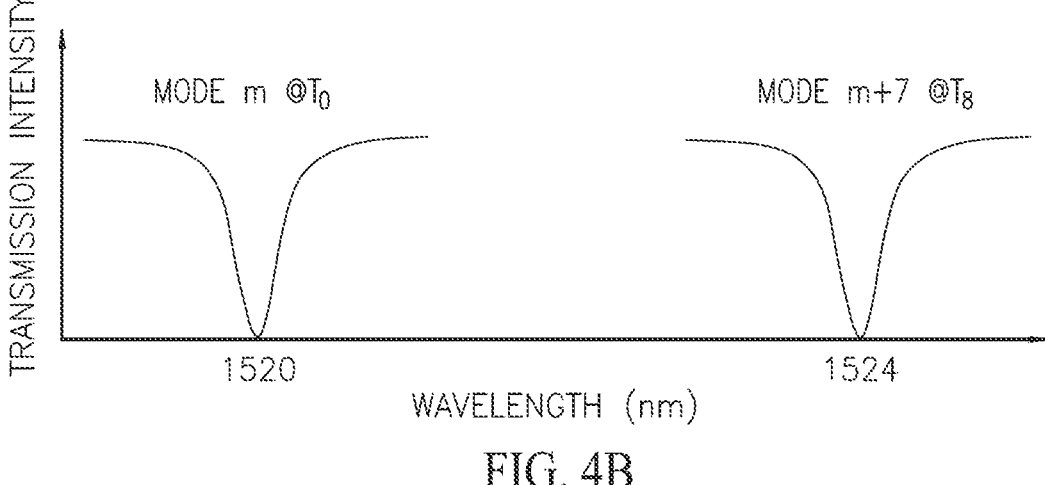
FIG. 4B is a graph illustrating an example in which, as the temperature in an optical resonator varies over a wide range of temperatures, the resonant wavelength of different modes of the optical resonator may be present in a narrower range of wavelengths.

As noted earlier, FIG. 4A is a graph illustrating an example in which, as the temperature in an optical resonator varies over a wide range of temperatures, the resonant wavelength of a single, particular mode of the optical resonator varies over a wide range of wavelengths. In comparison, FIG. 4B is a graph showing that, as the temperature in an optical resonator varies over a wide range of temperatures, different modes of the optical resonator may resonate in the same narrower (short) range of wavelengths, for example (without limitation) 1520 nm to 1524 nm. Thus, a light source that produces light in the narrower (short) range of wavelengths may be used with the temperature measurement system, and the temperature measurement system may still determine accurate temperature measurements over a wide range of temperatures.

For example, whereas at temperature $T_0$ mode m of the optical resonator resonates at 1520 nm, at temperature $T_8$ mode m+7 of the optical resonator resonates at 1524 nm. In both cases, the respective resonant wavelengths (1520 nm and 1524 nm) of mode m and mode m+7 of the optical resonator are both detected within the short range of the input light spanning 1520 nm to 1524 nm, yet the temperature measurement system is able to determine temperature measurements that range much wider, from $T_0$ to $T_8$.

Figure 5:
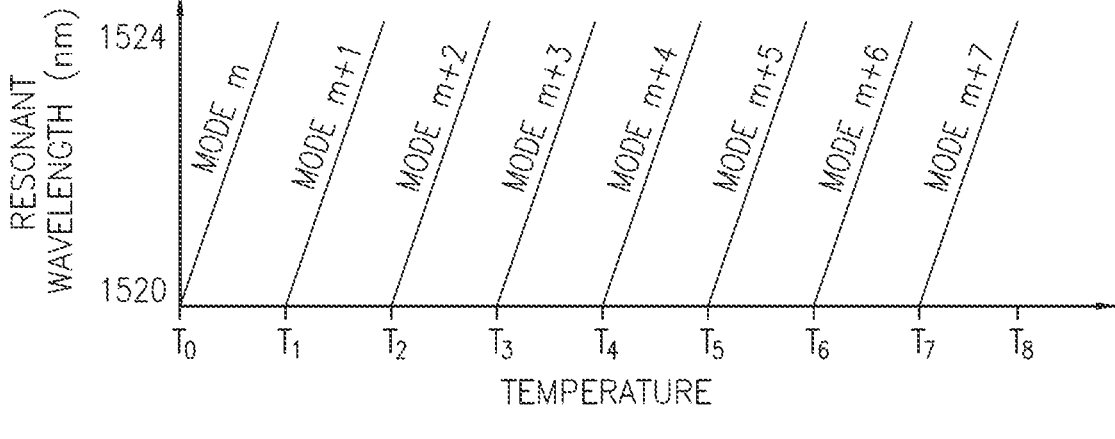
FIG. 5 is a graph illustrating a set of characteristic relationships that indicate a range of resonant wavelengths of an optical resonator relative to a range of temperatures in the optical resonator in different modes of the optical resonator.

FIG. 5 further illustrates this aspect of the present disclosure, and depicts a set of characteristic relationships that indicate of a range of resonant wavelengths of an optical resonator relative to a range of temperatures in the optical resonator in different modes of the optical resonator. It is observed that different resonant wavelengths for different modes of the optical resonator for different subranges of temperature may occur within a short wavelength range, illustrated here as 1520 nm to 1524 nm.

In the example shown in FIG. 5, when the temperature in the optical resonator is in a range of temperature $T_7$ to temperature $T_8$, a resonant wavelength in mode m+7 of the optical resonator is observed in the range of 1520 nm to 1524 nm. When the temperature in the optical resonator is in a range of $T_0$ to $T_1$, a resonant wavelength in mode m of the optical resonator is observed in the range of 1520 nm to 1524 nm. The temperature measurement system is thus able to use a rough temperature measurement of the optical resonator to determine which mode of the optical resonator is resonating, or is expected to resonate, in the short range of wavelengths, e.g., 1520 nm to 1524 nm, of the light that is input to the temperature measurement system. FIG. 5 illustrates eight characteristic relationships, for modes m to m+7 of the optical resonator, in which each mode of the optical resonator has a resonant wavelength within the short range of 1520 nm to 1524 nm for different temperature subranges that collectively span a range of temperatures from $T_0$ to $T_8$. Knowing the mode of the optical resonator enables the temperature measurement system to accurately correlate the detected resonant wavelength of the optical resonator to the temperature in the optical resonator.

FIG. 5 illustrates only one, simplified example of eight characteristic curves for eight modes of an optical resonator. While in FIG. 5 the characteristic curves appear linear and of equal slope, it should be understood that other optical resonators may have greater or fewer modes with characteristic curves of different slope or curvilinear shape. Furthermore, the characteristic curves of different modes of an optical resonator may overlap one another in the same narrow input light range (e.g., 1520 nm to 1524 nm) for the same temperature of the optical resonator. In such cases where there is overlap of characteristic curves at a given temperature, light may resonate in the optical resonator in more than one mode at that temperature in the narrow input light range (1520 nm to 1524 nm). It should also be understood that FIG. 5 shows only a short segment of the overall characteristic curve for each mode of the optical resonator, within the short range of input light wavelengths (here, 1520 nm to 1524 nm). As the temperature of the optical resonator increases or decreases, each of the modes shown have resonant wavelengths outside the illustrated 1520 nm to 1524 nm range.

For a given optical resonator, e.g., optical resonator 306 shown in FIG. 3, the temperature in the optical resonator 306 is indicative of a temperature of the environment of the optical resonator 306. The computing device 314 may be programmed with characteristic relationships stored in a memory 316 in the form of a mathematical function or equation or a look-up table defining the relationship between a detected resonant wavelength of the optical resonator 306, for a particular mode, to the temperature in the optical resonator 306, as shown for example in FIG. 5. Once the mode of the optical resonator is determined, the computing device 314 is able to determine the temperature in the optical resonator from the function or equation or look-up table that embodies the characteristic relationship for the determined mode.

The temperature measurement system 300 is thus able to accurately measure a temperature using a simpler light source 302 that outputs light in a short range of wavelengths. By using multiple modes of the optical resonator 306 and a light source 302 with a short tunability range, the temperature measurement system 300 produces a temperature reading with higher accuracy, that is more stable and generally less expensive to manufacture and operate, and may involve less maintenance relative to prior art photonic thermometers.

In view of the above, various embodiments of a temperature measurement system thus include an optical resonator (e.g., optical resonator 306) in which light resonates at a resonant wavelength that varies relative to a temperature in the optical resonator, and a detector (e.g., detector 308) that receives output light from the optical resonator, detects in the output light a resonant wavelength of the optical resonator, and produces a signal indicating the resonant wavelength of the optical resonator.

The temperature measurement system further includes a computing subsystem configured to receive, from the detector, the signal indicating the resonant wavelength of the optical resonator. The computing subsystem identifies a mode of the optical resonator in which light is resonating based on a first temperature indication in or proximate to the optical resonator obtained from a temperature measurement device (e.g., temperature measurement device 312) in a first temperature accuracy range. In this regard, the computing subsystem may use a function, such as an equation or look-up table, to identify the mode of the optical resonator based on the first temperature indication.

The first temperature indication may be a coarse or rough temperature measurement of the optical resonator, obtained for example using a thermocouple or an interferometer. Because the first temperature indication is a coarse or rough temperature measurement, the first temperature accuracy range of the first temperature indication may have a lower accuracy as compared to a second, more accurate temperature measurement obtained using a detected resonant wavelength of the optical resonator and an identified mode of the optical resonator, as described herein.

Based on the mode of the optical resonator, the computing subsystem obtains a characteristic relationship that is indicative of a range of resonant wavelengths of the optical resonator relative to a range of temperatures in the optical resonator in the mode of the optical resonator, e.g., as illustrated in FIG. 5. As noted earlier, FIG. 5 depicts one example of a set of characteristic relationships that relate resonant wavelengths of an optical resonator to temperature in the optical resonator in different modes of the optical resonator in a short range of wavelengths (e.g., from 1520 nm to 1524 nm). For example, when the (rough) first temperature indication in or proximate to the optical resonator indicates a resonator temperature in a range of $T_0$ to $T_1$, the computing subsystem is able to determine that in mode m of the optical resonator a resonant wavelength should appear in the output of the optical resonator. The computing subsystem retrieves the characteristic relationship for mode m. Thereafter, depending on the actual detected resonant wavelength of the optical resonator (in the range of 1520-1524 nm), the computing subsystem determines the (more accurate) second temperature indication based on the detected resonant wavelength and the retrieved characteristic relationship.

The computing subsystem determines the second temperature indication in the optical resonator in a second temperature accuracy range having greater accuracy than the first temperature accuracy range of the first temperature indication. In other words, the second temperature accuracy range of the second temperature indication has a smaller tolerance around the actual temperature, and thus has greater accuracy than the first temperature accuracy range of the (rough) first temperature indication. By way of example, the first temperature accuracy range may include temperatures within 1° C. of the actual temperature while the second temperature accuracy range may include temperatures within 0.1° C. of the actual temperature. As another example, the first temperature accuracy range may include temperatures within 10 K of the actual temperature while the second temperature accuracy range may include temperatures that are ±10 mK of the actual temperature. The computing subsystem thereafter outputs a temperature measurement based on the second temperature indication.

In other modes of the optical resonator, light resonates in the optical resonator within the short range of wavelengths (e.g., 1520-1524 nm) at different temperatures in the optical resonator. For example, when the (rough) first temperature indication in or proximate to the optical resonator indicates a resonator temperature in a range of $T_1$ to $T_2$, the computing subsystem determines that in mode m+1 of the optical resonator a resonant wavelength should appear in the output of the optical resonator (in the range of 1520-1524 nm). The computing subsystem retrieves a characteristic relationship for mode m+1, e.g., as illustrated in FIG. 5.

Similarly, when the (rough) first temperature indication in or proximate to the optical resonator indicates a resonator temperature in a range of $T_2$ to $T_3$, or $T_3$ to $T_4$, or $T_4$ to $T_5$, or $T_5$ to $T_6$, or $T_6$ to $T_7$, or $T_7$ to $T_8$, the computing subsystem determines that a resonant wavelength of the optical resonator in mode m+2, or mode m+3, or mode m+4, or mode m+5, or mode m+6, or mode m+7, respectively should be detected in the output of the optical resonator. The computing subsystem retrieves the characteristic relationship for mode m+2 (or mode m+3, or mode m+4, or mode m+5, or mode m+6, or mode m+7 as the case may be), as illustrated in FIG. 5. In this manner, using different modes of the optical resonator allows the temperature measurement system to measure temperature over a wide range of temperatures using a short range light source for inputting light to the optical resonator.

In some cases, a light source for inputting light to the optical resonator is configured to produce light in a maximum output wavelength range of 10 nm or less. In some cases, the light source produces light in a maximum output wavelength range of 9 nm, 8 nm, 7 nm, 6 nm, 5 nm, 4 nm, 3 nm, 2 nm, or 1 nm or less. Moreover, the tuning wavelength range of the light source can be of any range specification, such as a tuning wavelength range of 3, 3.001, 3.5, 2.4, or 1, for example. The optical resonator is coupled to receive light from the light source and output light to a detector.

In some cases, the light source may be controlled so as to produce light in a subrange of wavelengths that is smaller than the maximum output wavelength range of the light source. In some cases, the subrange of wavelengths may be determined based on the (rough) first temperature indication. For example, using the characteristic relationships of FIG. 5, if the first temperature indication is sufficiently accurate to indicate that the temperature in the optical resonator is in a range of $T_0$ to $T_0+(T_0-T_0)/2$, the light source may not need to scan the entire 4 nm range from 1520 nm to 1524 nm. It may be sufficient to input light only in a 2 nm range, from 1520 nm to 1522 nm, to the optical resonator to obtain a detected resonant wavelength that, based on the characteristic relationship (for mode m in this example), corresponds to a (more accurate) second temperature indication in the optical resonator. Using a subrange of wavelengths for the light that is input to the optical resonator is advantageous in that, by only needing to scan a shorter subrange of wavelengths (e.g., 2 nm, from 1520 nm to 1522 nm in the example above), a shorter delivery of the input light may result in faster detection of the resonant wavelength of the optical resonator, and ultimately a (more accurate) second temperature indication is more quickly determined.

In some cases, the temperature measurement system further includes a memory (e.g., memory 316) in communication with the computing subsystem (e.g., computing device 314). The computing subsystem may be configured to identify the mode of the optical resonator using the first temperature indication and information stored in the memory that correlates temperatures in the optical resonator with respective modes of the optical resonator. For example, the information stored in the memory that relates rough temperatures in the optical resonator with respective modes of the optical resonator may be arranged in a look-up table that correlates temperature ranges with respective modes of the optical resonator. The mode of the optical resonator is identified from the look-up table based on a temperature range that includes the first temperature indication. In some cases, the temperature measurement system further includes a memory (e.g., memory 316) in communication with the computing subsystem (e.g., computing device 314) in which modes of the optical resonator are correlated with respective characteristic relationships. As noted earlier, each characteristic relationship relates resonant wavelengths of the optical resonator to temperatures in the optical resonator in a second temperature accuracy range having greater accuracy than the first temperature accuracy range of the (rough) first temperature indication. That is, the second temperature indication is within a smaller tolerance around the actual temperature than the first temperature measurement. The computing subsystem may be configured to obtain the characteristic relationship by retrieving the characteristic relationship, e.g., from the memory or another computing system, based on the identified mode of the optical resonator.

In some cases, the temperature measurement system uses the detector to detect two or more resonant wavelengths in the output light of the optical resonator and produce a signal indicating to the computing subsystem the two or more resonant wavelengths of the optical resonator. The two or more resonant wavelengths may be detected by detecting two or more peaks in an optical intensity or power in the output light of the optical resonator.

In some cases, the computing subsystem may be configured to identify two or more modes of the optical resonator based on the first temperature indication and thereafter obtain, based on the two or more modes of the optical resonator, two or more respective characteristic relationships, wherein each characteristic relationship indicates a range of resonant wavelengths of the optical resonator relative to a range of temperatures in the optical resonator in a respective mode. As with the earlier-described embodiments, the temperature measurement system determines, based on the two or more resonant wavelengths of the optical resonator and the two or more respective characteristic relationships, a second temperature indication in the optical resonator in a (more accurate) second temperature accuracy range.

In some cases, the computing subsystem may be configured to determine two or more intermediate temperature indications of the optical resonator based on the detected two or more resonant wavelengths of the optical resonator and the two or more respective characteristic relationships. The computing subsystem may determine the (more accurate) second temperature indication in the optical resonator based on a mathematical operation on the two or more intermediate temperature indications (e.g., an average or a mean of the two or more intermediate temperature indications, including a arithmetic mean or a weighted mean).

In some cases, the detector is configured to detect in the output light of the optical resonator two or more resonant wavelengths of the optical resonator. The signal produced by the detector may indicate a resonant wavelength that is selected from the two or more detected resonant wavelengths. The resonant wavelength may be selected based on which resonant wavelength of the two or more resonant wavelengths has a greater intensity in the output light. In some cases, a wavelength having a greater intensity in the output light is indicative of a wavelength having greater resonance in the optical resonator, and using the wavelength of greater resonance in the methods described herein may yield a more-accurate temperature measurement. In addition to indicating greater resonance in the optical resonator, a wavelength having a greater intensity in the output light has a larger signal-to-noise ratio, providing greater confidence in the detection of a resonant wavelength in a mode of the optical resonator.

Figure 6:
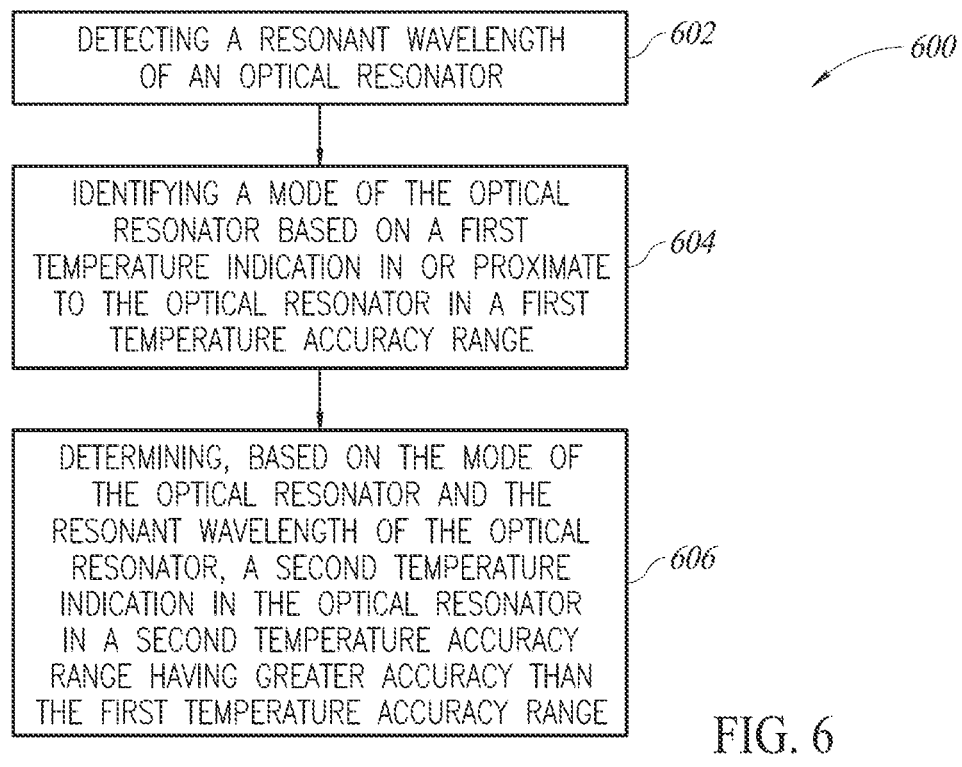
FIG. 6 is a flow diagram illustrating a method for temperature measurement in accordance with the present disclosure.

The present disclosure includes various methods for temperature measurement. In at least one embodiment as illustrated in FIG. 6, a method 600 of the present disclosure includes detecting a resonant wavelength of an optical resonator as indicated in block 602, identifying a mode of the optical resonator based on a first temperature indication in or proximate to the optical resonator in a first temperature accuracy range as indicated in block 604, and determining, based on the mode of the optical resonator and the resonant wavelength of the optical resonator, a second temperature indication in the optical resonator in a second temperature accuracy range having greater accuracy than the first temperature accuracy range as indicated in block 606. In some cases, the first temperature indication is received from a thermocouple. In some cases, the first temperature indication is received from an interferometer. In some cases, the first temperature indication may be obtained using the optical resonator itself.

In some cases, the mode of the optical resonator may be identified using the first temperature indication and a function, e.g., stored in a memory, that correlates temperatures in the optical resonator with respective modes of the optical resonator. The function may be an equation or a look-up table that correlates temperature ranges with respective modes of the optical resonator, and the mode of the optical resonator may be identified using the equation or look-up table based on a temperature range that includes the (rough) first temperature indication.

In some cases, the method further includes obtaining, based on the mode of the optical resonator, a characteristic relationship indicative of a range of resonant wavelengths of the optical resonator relative to a range of temperatures in the optical resonator in the identified mode. Based on the resonant wavelength of the optical resonator and the characteristic relationship, the second temperature indication in the optical resonator is determined. In some cases, the characteristic relationship is obtained by retrieving the characteristic relationship from a memory (as an equation or function or table) in which modes of the optical resonator are correlated with respective characteristic relationships.

In some cases, the process of detecting a resonant wavelength of the optical resonator may include detecting two or more resonant wavelengths of the optical resonator. The (rough) first temperature indication may be determined at least in part on a mathematical operation on the two resonant wavelengths and a mapping of an output of the mathematical operation to a temperature in the optical resonator. The mathematical operation may be a subtraction operation that determines a wavelength difference between the two resonant wavelengths, and the mapping may be a mapping of wavelength differences to respective temperatures in the optical resonator.

Furthermore, identifying a mode of the optical resonator may include identifying two or more modes of the optical resonator based on the first temperature indication. The (more accurate) second temperature indication in the optical resonator may be determined based on the two or modes of the optical resonator and the two or more resonant wavelengths of the optical resonator.

In some cases, the method may further include obtaining two or more respective characteristic relationships based on the two or more modes of the optical resonator. Each characteristic relationship indicates a range of resonant wavelengths of the optical resonator relative to a range of temperatures in the optical resonator in a respective mode. The (more accurate) second temperature indication is determined based on the two or more resonant wavelengths of the optical resonator and the two or more respective characteristic relationships.

In some cases, the method may further include determining two or more intermediate temperature indications of the optical resonator based on the two or modes of the optical resonator and the two or more respective characteristic relationships. The (more accurate) second temperature indication may be determined based on a mathematical operation on the two or more intermediate temperature indications, such as an average or mean of the two or more intermediate temperature indications.

In some cases, the process of detecting a resonant wavelength of the optical resonator may include detecting two or more resonant wavelengths of the optical resonator and selecting one of the resonant wavelengths for further processing. In some cases, the selection of one of the resonant wavelengths may be performed by determining which resonant wavelength of the two or more resonant wavelengths has a greater detected intensity.

In some cases, the method further includes controlling a light source such that light that is output to the optical resonator is limited to a subrange of wavelengths that is smaller than a range of wavelengths that the light source is otherwise capable of outputting to the optical resonator. As noted earlier, controlling the light source in this manner may be advantageous in that faster detection of the resonant wavelength of the optical resonator may be obtained by only needing the light source to output a smaller subrange of wavelengths (e.g., 1520 nm to 1522 nm, rather than 1520 nm to 1524 nm), and ultimately a (more accurate) second temperature indication may be more quickly determined.

Figure 7:
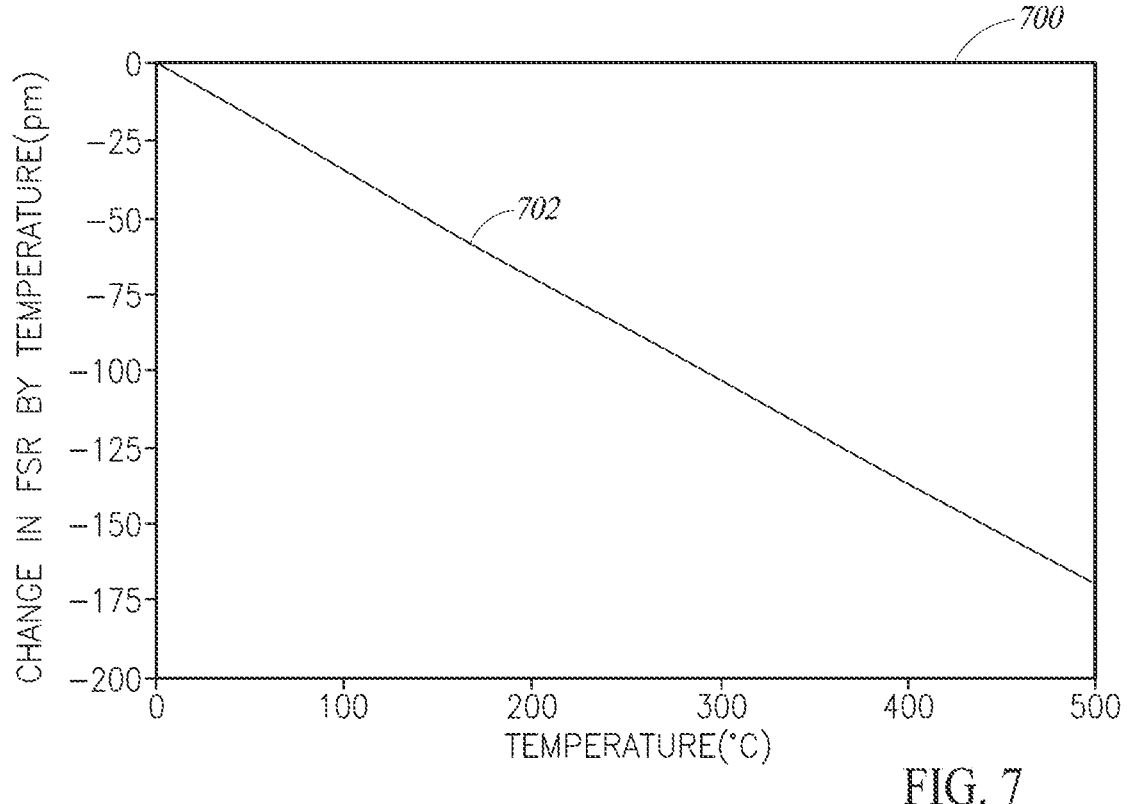
FIG. 7 is a diagram illustrating a change in free spectral range of an optical resonator with respect to temperature in the optical resonator.

It has also been discovered that the difference between two resonant wavelengths (also known as free spectral range) is unique to the modes of the optical resonator producing the resonant wavelengths. Moreover, the free spectral range between two resonant wavelengths changes or varies according to the temperature in the optical resonator, so as the temperature in the optical resonator varies, the amount of free spectral range also varies. FIG. 7, for example, provides a diagram 700 that illustrates a variation or change in free spectral range of an optical resonator with respect to temperature in the optical resonator. In this example, the curve 702 shows that as the temperature in the optical resonator increases, the change in free spectral range between two resonant wavelengths decreases.

Thus, in yet further embodiments of the present disclosure, a (rough) first temperature indication may not be needed. In some cases, an embodiment may determine a temperature measurement by detecting at least two resonant wavelengths of an optical resonator, and determining the temperature measurement based at least in part on a mathematical operation on the at least two resonant wavelengths and a mapping of an output of the mathematical operation to a temperature in the optical resonator.

A mode of the optical resonator can be identified from a determined distance (wavelength difference or free spectral range) between two resonant wavelengths. As noted, the determined distance is unique to particular modes of the optical resonator. Once at least one mode of the optical resonator is identified according to a free spectral range determination, the mode of the optical resonator can be used to retrieve a characteristic relationship for the mode so that a detected resonant wavelength is usable to determine a temperature indication in the optical resonator from which a temperature measurement can be output.

Figure 8:
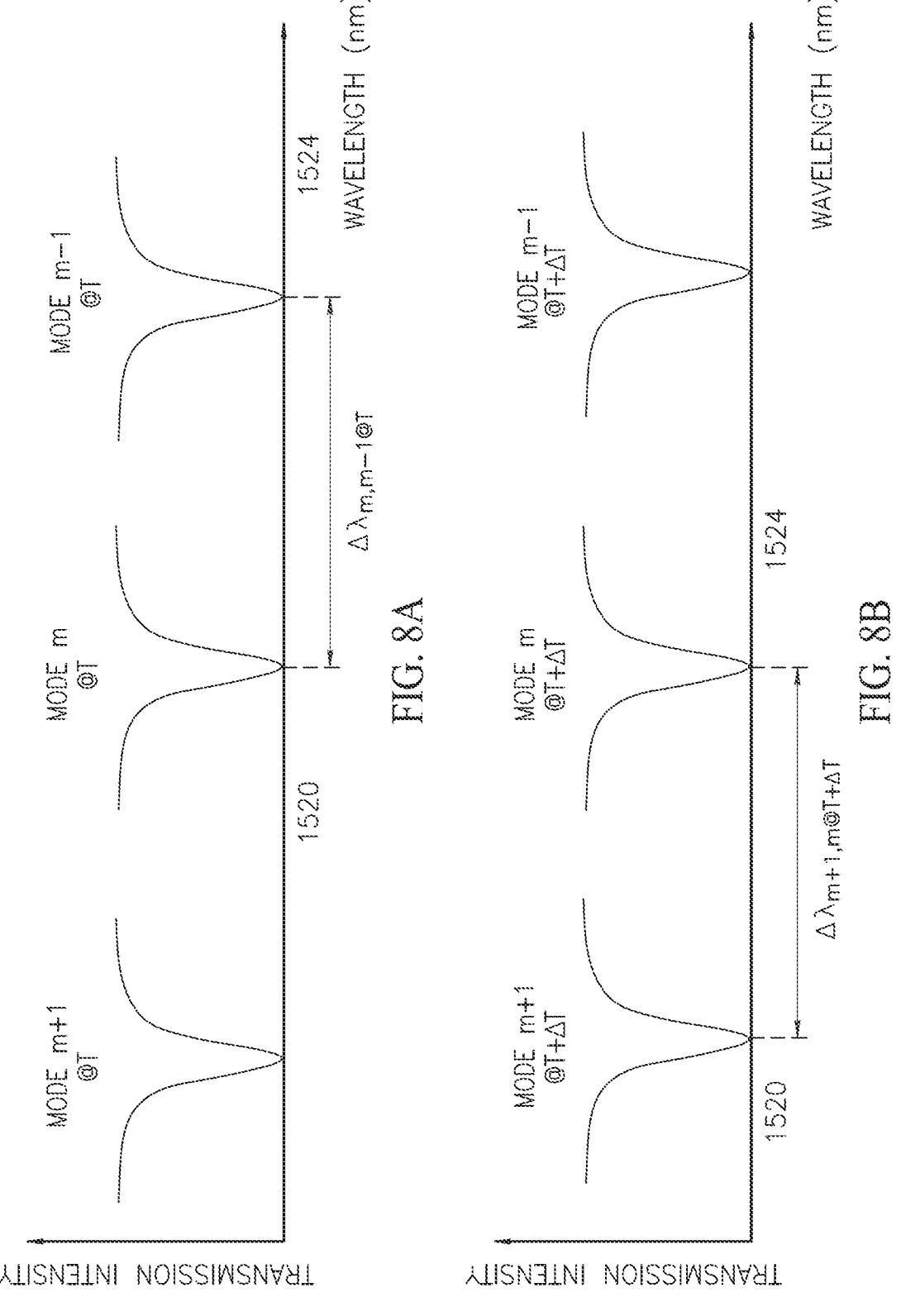
FIG. 8A is a diagram illustrating a first determination of free spectral range between two resonant wavelengths according to two modes of an optical resonator at a first temperature.
FIG. 8B is a diagram illustrating a second determination of free spectral range between two resonant wavelengths according to two modes of the optical resonator at a second temperature different from the first temperature in FIG. 8A.

For example, FIG. 8A is a diagram illustrating a determination of wavelength difference or free spectral range between two resonant wavelengths (in this case, two adjacent resonant wavelengths) according to two longitudinal modes of an optical resonator, namely mode m and mode m−1, at a first temperature T. For mode m, the intensity of light transmitted through the optical device and detected by the detector indicates a resonant wavelength $\lambda_m$ of the light in the optical resonator at about 1521 nm. For mode m−1, the intensity of the light transmitted through the optical device indicates a resonant wavelength $\lambda_{m-1}$ at about 1523 nm. The difference (distance or free spectral range) $\Delta\lambda_{m,m-1}$ between the resonant wavelengths of mode m and mode m−1 is unique to the pair of modes mode m and mode m−1. Thus, the determined free spectral range $\Delta\lambda_{m,m-1}$ is usable to identify one of or both mode m and mode m−1.

FIG. 8B is a diagram illustrating a second determination of free spectral range between two resonant wavelengths according to two modes of the optical resonator at a second temperature T+ΔT that is different from the first temperature T indicated in FIG. 8A. As the temperature changes from temperature T to temperature T+ΔT in this example, the resonant wavelengths of different modes of the optical resonator appear in the 1520 nm to 1524 nm range. In this example, at temperature T+ΔT, the resonant wavelength of mode m−1 no longer appears in the 1520 nm to 1524 nm range. Instead, the detector detecting the intensity of light transmitted through the optical device detects a resonant wavelength pertaining to mode m+1 and another resonant wavelength pertaining to mode m. By way of comparison of FIGS. 8A and 8B, it can been seen that the resonant wavelength of mode m has shifted according to the change in temperate ΔT.

The difference (or free spectral range) $\Delta\lambda_{m+1,m}$ between the resonant wavelengths of mode m+1 and mode m is different than the free spectral range $\Delta\lambda_{m,m-1}$ between the resonant wavelengths of mode m and mode m−1. Because the free spectral range $\Delta\lambda_{m+1,m}$ is unique to mode m+1 and mode m, the free spectral range $\Delta\lambda_{m+1,m}$ is usable to identify the mode number of one of or both mode m+1 and mode m.

Once the mode of the optical resonator is identified (e.g., mode m+1, mode m, and/or mode m−1) according to the determination of free spectral range, the mode of the optical resonator may be used to obtain a characteristic relationship (e.g., a function or equation or look-up table or the like, as earlier described) for the mode so that a detected resonant wavelength of the mode can be used to determine a temperature indication in the optical resonator from which a temperature measurement may be output.

In addition, determining the distance between resonant wavelengths at two modes, along with a precise temperature indication, can be useful for monitoring the operation of the optical resonator, and in particular, to discern if there has been a change in behavior of the optical resonator. If the determined distance between resonant wavelengths at two modes reveals a significant change or departure from an expected or predicted relationship between the resonant wavelengths and the modes, it is possible to detect changes in operation of the optical resonator that might lead to errors or drift in the reported temperature(s). A shift in relationship between the resonant wavelengths and the modes of the optical resonator may indicate, for example, a new or changed stress state of the optical resonator. It can be advantageous to use this to identify changes in the operation of the optical resonator. Indeed, when more modes are measured (i.e., two or more), there is greater opportunity to draw conclusions about the optical resonator, and the temperature thereof, from the multiple, collective measurements. A change in resonant wavelength or wavelengths for example, producing a changed relative position of modes of the optical resonator, may be used to determine a correction that, when applied, improves performance of the temperature measurement, therefore reducing uncertainty of the temperature measurement system.

Figure 9:
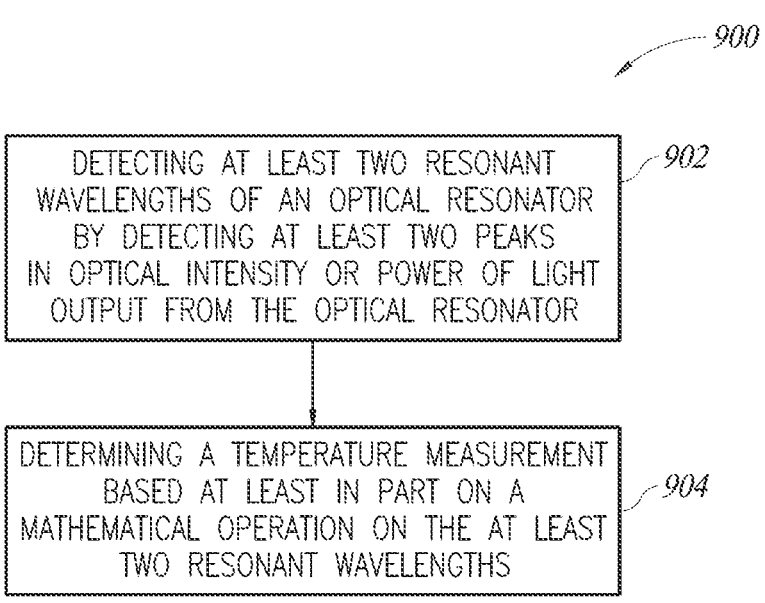
FIG. 9 is flow diagram illustrating another method for temperature measurement in accordance with the present disclosure.

In still other embodiments of the present disclosure, neither a (rough) first temperature indication nor a determination of the mode of the optical resonator is needed. In some cases, as illustrated in FIG. 9, a method 900 for temperature measurement may include detecting at least two resonant wavelengths of an optical resonator as indicated in block 902, wherein the resonant wavelengths vary relative to a temperature of the optical resonator. The resonant wavelengths may be detected by detecting at least two peaks in an optical intensity or power in the light output from the optical resonator. The method 900 determines a temperature measurement (e.g., the temperature of the optical resonator) based at least in part on a mathematical operation (e.g., a subtraction operation) using the at least two resonant wavelengths as indicated in block 904. In some cases, the temperature measurement is determined based on a mapping of an output of the mathematical operation (e.g., a wavelength difference) to a temperature of the optical resonator. In some cases, the mapping of outputs of the mathematical operation to temperatures of the optical resonator may be obtained empirically and recorded in a memory as a characteristic relationship, e.g., in the form of a function or equation or a look-up table that maps of the wavelength difference to the temperature of the optical resonator.

In some cases, the mathematical operation is a subtraction operation that determines a wavelength difference between two resonant wavelengths. In some cases, the two resonant wavelengths are adjacent to each other in a series of resonant wavelengths of the optical resonator, e.g., mode m+1 and mode m, or mode m and mode m−1, as illustrated in FIG. 8A. In other cases, the two resonant wavelengths are not adjacent to each other in a series of resonant wavelengths of the optical resonator, e.g., mode m+1 and mode m−1. In this latter example, a subtraction operation that determines a wavelength difference between the resonant wavelengths of mode m+1 and mode m−1 may be used in connection with a mapping of such wavelength differences to temperatures of the optical resonator in order to determine the temperature of the optical resonator.

In some embodiments, the method may further include identifying a mode of the optical resonator based on the mathematical operation on the two resonant wavelengths. For example, the method may identify a mode of the optical resonator based on a wavelength difference between two resonant wavelengths, wherein the mode of the optical resonator is associated with a resonant wavelength of the two resonant wavelengths, and the temperature of the optical resonator is determined based on the mode of the optical resonator and a mapping of the resonant wavelength to the temperature of the optical resonator in the mode. In some cases, the method may identify at least two modes of the optical resonator based on the wavelength difference, wherein the two modes of the optical resonator are associated with the two resonant wavelengths respectively.

In some cases, both the mode and the wavelength difference may be used to determine a more-accurate temperature measurement. For example, embodiments described herein may determine a (rough) first temperature indication based at least in part on a mathematical operation on the two resonant wavelengths and a mapping of an output of the mathematical operation to a temperature in the optical resonator. The wavelength difference between resonant wavelengths in an optical resonator may be mode-dependent, for example when the refractive index of the resonator material (or resonator waveguide effective refractive index) is wavelength dependent (i.e., has dispersion) in addition to being temperature dependent. Once at least one mode of the optical resonator is identified, the first temperature indication (or temperature measurement) may be refined (e.g., using a mode-dependent characteristic relationship as described herein) to determine a more-accurate second temperature indication (or temperature measurement).

In some cases, the temperature of the optical resonator may be determined based on the mode of the optical resonator and a resonant wavelength of the two resonant wavelengths of the optical resonator, in a manner as described earlier herein. In some cases, the two resonant wavelengths correspond respectively to two modes of the optical resonator, the mathematical operation is a subtraction operation that determines a wavelength difference between the two resonant wavelengths, and the wavelength difference is indicative of the two modes of the optical resonator.

In some cases (e.g., using ideal material and waveguide(s) for the optical resonator), the free spectral ranges (in the frequency domain) for all modes are the same and only dependent on the temperature. In these cases, by measuring free spectral range, a rough temperature can be estimated. The mode number can be identified based on the temperature estimation and a corresponding resonant wavelength of the optical resonator.

In some cases, the method may include determining two intermediate temperature indications based on the two modes of the optical resonator and the two resonant wavelengths. The temperature of the optical resonator is determined based on a second mathematical operation on the two or more intermediate temperature indications. In some cases, the second mathematical operation is a mean operation that produces a mean (an arithmetic mean, a weighted mean, etc.) of the two or more intermediate temperature indications. Alternative mathematical operations may be used.

In some cases, the method may further include obtaining at least two characteristic relationships from a memory based respectively on the two identified modes of the optical resonator. Each characteristic relationship indicates a range of resonant wavelengths of the optical resonator relative to a range of temperatures in the optical resonator for a respective mode. The at least two intermediate temperature indications may be determined based on the two or more resonant wavelengths of the optical resonator and the two or more respective characteristic relationships.

In some cases, the method further includes obtaining, based on a mode of the optical resonator, a characteristic relationship indicative of a range of resonant wavelengths of the optical resonator relative to a range of temperatures of the optical resonator in the mode. The temperature of the optical resonator is determined based on the characteristic relationship and the respective resonant wavelength of the two resonant wavelengths of the optical resonator. In some cases, the characteristic relationship is obtained by retrieving the characteristic relationship from a memory in which modes of the optical resonator are correlated with respective characteristic relationships.

In some cases where two modes of the optical resonator are identified and two intermediate temperature indications are determined as described herein, the method includes obtaining two characteristic relationships from a memory based respectively on the two modes of the optical resonator, each characteristic relationship indicating a range of resonant wavelengths of the optical resonator relative to a range of temperatures of the optical resonator in a respective mode of the two modes. The two characteristic relationships provide respective mappings of the two resonant wavelengths to the two intermediate temperature indications for the optical resonator in the two modes.

In some cases, the method further includes controlling a light source such that light that is output to the optical resonator is limited to a subrange of wavelengths that is smaller than a range of wavelengths that the light source is otherwise capable of outputting to the optical resonator, as described earlier herein.

In light of the foregoing description, the following non-exclusive list of examples illustrates particular implementations of systems and methods that are completed by the present disclosure.

Example 1: A temperature measurement system, comprising an optical resonator in which light resonates at a resonant wavelength that varies relative to a temperature in the optical resonator; a detector configured to receive output light from the optical resonator, detect in the output light a resonant wavelength of the optical resonator, and produce a signal indicating the resonant wavelength of the optical resonator; and a computing subsystem configured to: receive, from the detector, the signal indicating the resonant wavelength of the optical resonator; identify a mode of the optical resonator based on a first temperature indication of a first temperature in or proximate to the optical resonator in a first temperature accuracy range; obtain, based on the mode of the optical resonator, a characteristic relationship indicative of a range of resonant wavelengths of the optical resonator relative to a range of temperatures in the optical resonator in the mode; determine, based on the resonant wavelength of the optical resonator and the characteristic relationship, a second temperature indication of a second temperature in the optical resonator in a second temperature accuracy range having greater accuracy than the first temperature accuracy range; and output a temperature measurement based on the second temperature indication.

Example 2: The temperature measurement system as described in Example 1, wherein the computing subsystem is configured to receive the first temperature indication from a thermocouple or an interferometer.

Example 3: The temperature measurement system as described in Example 1, further comprising a light source configured to produce light in a maximum output wavelength range of 10 nm or less, wherein the optical resonator is coupled to receive light from the light source.

Example 4: The temperature measurement system as described in Example 3, wherein the light source is controllable to produce light in a subrange of wavelengths that is smaller than the maximum output wavelength range, and the subrange of wavelengths is determined based on the first temperature indication.

Example 5: The temperature measurement system as described in Example 1, further comprising a memory, wherein the computing subsystem is configured to identify the mode of the optical resonator using the first temperature indication and information stored in the memory that correlates temperatures in the optical resonator with respective modes of the optical resonator.

Example 6: The temperature measurement system as described in Example 5, wherein the information stored in the memory is a look-up table that correlates temperature ranges with respective modes of the optical resonator, and the mode of the optical resonator is identified from the look-up table based on a temperature range that includes the first temperature indication.

Example 7: The temperature measurement system as described in Example 1, further comprising a memory in which modes of the optical resonator are correlated with respective characteristic relationships, each characteristic relationship relating resonant wavelengths of the optical resonator to temperatures in the optical resonator in the second temperature accuracy range, wherein the computing subsystem is configured to obtain the characteristic relationship by retrieving the characteristic relationship from the memory based on the mode of the optical resonator.

Example 8: The temperature measurement system as described in Example 1, wherein the resonant wavelength detected by the detector is a first resonant wavelength and the detector is configured to detect in the output light a second resonant wavelength of the optical resonator, wherein the signal produced by the detector indicates the first and second resonant wavelengths of the optical resonator, and wherein the computing subsystem is configured to: identify two or more modes of the optical resonator based on the first temperature indication; obtain, based on the two or more modes of the optical resonator, two or more respective characteristic relationships, each characteristic relationship indicating a range of resonant wavelengths of the optical resonator relative to a range of temperatures in the optical resonator in a respective mode; and determine, based on the first and second resonant wavelengths of the optical resonator and the two or more respective characteristic relationships, the second temperature indication in the optical resonator in the second temperature accuracy range.

Example 9: The temperature measurement system as described in Example 8, wherein the computing subsystem is further configured to determine first and second intermediate temperature indications of the optical resonator based on the first and second resonant wavelengths of the optical resonator and the two or more respective characteristic relationships; and determine the second temperature indication in the optical resonator based on a mathematical operation on the first and second intermediate temperature indications.

Example 10: The temperature measurement system as described in Example 1, wherein the resonant wavelength detected by the detector is a first resonant wavelength and the detector is configured to detect in the output light a second resonant wavelength of the optical resonator, wherein the signal produced by the detector indicates the first and second resonant wavelengths of the optical resonator, and the method further comprises determining the first temperature indication based at least in part on a mathematical operation on the first and second resonant wavelengths and a mapping of an output of the mathematical operation to the temperature in the optical resonator.

Example 11: The temperature measurement system as described in Example 10, wherein the detector is configured to detect in the output light two or more resonant wavelengths of the optical resonator, and the signal produced by the detector indicates a selected resonant wavelength of the two or more resonant wavelengths, the selected resonant wavelength being selected based on which resonant wavelength of the two or more resonant wavelengths has a greater intensity in the output light.

Example 12: A method for temperature measurement, comprising detecting a resonant wavelength of an optical resonator; identifying a mode of the optical resonator based on a first temperature indication of a first temperature in or proximate to the optical resonator in a first temperature accuracy range; and determining, based on the mode of the optical resonator and the resonant wavelength of the optical resonator, a second temperature indication of a second temperature in the optical resonator in a second temperature accuracy range having greater accuracy than the first temperature accuracy range.

Example 13: The method as described in Example 12, wherein the identifying the mode of the optical resonator comprises using the first temperature indication and a function that correlates temperatures in the optical resonator with respective modes of the optical resonator.

Example 14: The method as described in Example 12, further comprising obtaining, based on the mode of the optical resonator, a characteristic relationship indicative of a range of resonant wavelengths of the optical resonator relative to a range of temperatures in the optical resonator in the mode, wherein the determining the second temperature indication in the optical resonator comprises using the characteristic relationship and the resonant wavelength of the optical resonator.

Example 15: The method as described in Example 12, further comprising determining the first temperature indication by detecting two resonant wavelengths of the optical resonator; and determining the first temperature indication based at least in part on a mathematical operation on the two resonant wavelengths and a mapping of an output of the mathematical operation to a temperature in the optical resonator.

Example 16: The method as described in Example 15, wherein the mathematical operation is a subtraction operation that determines a wavelength difference between the two resonant wavelengths, and the mapping is a mapping of wavelength differences to respective temperatures in the optical resonator.

Example 17: The method as described in Example 12, wherein the resonant wavelength of the optical resonator is a first resonant wavelength, and the method further comprises detecting a second resonant wavelength of the optical resonator, wherein the identifying the mode of the optical resonator includes identifying two or more modes of the optical resonator based on the first temperature indication; and wherein the determining the second temperature indication in the optical resonator is based on the two or more modes of the optical resonator and the first and second resonant wavelengths of the optical resonator.

Example 18: The method as described in Example 17, further comprising obtaining, based on the two or more modes of the optical resonator, two or more respective characteristic relationships, each characteristic relationship indicating a range of resonant wavelengths of the optical resonator relative to a range of temperatures in the optical resonator in a respective mode, wherein the determining the second temperature indication includes determining the second temperature indication based on both the first and second resonant wavelengths of the optical resonator and the two or more respective characteristic relationships.

Example 19: The method as described in Example 18, further comprising determining first and second intermediate temperature indications of the optical resonator based on the first and second resonant wavelengths of the optical resonator and the two or more respective characteristic relationships; and determining the second temperature indication based on a mathematical operation on the first and second intermediate temperature indications.

Example 20: The method as described in Example 12, wherein the detecting the resonant wavelength of the optical resonator includes detecting two or more resonant wavelengths of the optical resonator and determining which resonant wavelength of the two or more resonant wavelengths has a greater intensity.

Example 21: A method for temperature measurement, comprising detecting at least two resonant wavelengths of an optical resonator, wherein the at least two resonant wavelengths vary relative to a temperature of the optical resonator; and determining the temperature of the optical resonator based at least in part on a mathematical operation on the at least two resonant wavelengths.

Example 22: The method as described in Example 21, wherein the detecting at least two resonant wavelengths includes detecting at least two peaks in an optical intensity or optical power of light emitted from the optical resonator.

Example 23: The method as described in Example 21, wherein the mathematical operation is a subtraction operation that determines a wavelength difference between two resonant wavelengths of the at least two resonant wavelengths, and the temperature of the optical resonator is determined based on a mapping of the wavelength difference to the temperature of the optical resonator.

Example 24: The method as described in Example 21, wherein the mathematical operation is a subtraction operation that determines a wavelength difference between two resonant wavelengths of the at least two resonant wavelengths, the method further comprising identifying a mode of the optical resonator based on the wavelength difference, wherein the mode of the optical resonator is associated with a resonant wavelength of the two resonant wavelengths, and the temperature of the optical resonator is determined based on the mode of the optical resonator and a mapping of the resonant wavelength to the temperature of the optical resonator in the mode.

Example 25: The method as described in Example 24, further comprising obtaining, based on the mode of the optical resonator, a characteristic relationship indicative of a range of resonant wavelengths of the optical resonator relative to a range of temperatures of the optical resonator in the mode, wherein the characteristic relationship provides the mapping of the resonant wavelength to the temperature of the optical resonator in the mode.

Example 26: The method as described in Example 21, wherein the detecting at least two resonant wavelengths includes detecting two resonant wavelengths that are adjacent to each other in a series of resonant wavelengths of the optical resonator.

Example 27: The method as described in Example 21, wherein the detecting at least two resonant wavelengths includes detecting two resonant wavelengths that are not adjacent to each other in a series of resonant wavelengths of the optical resonator.

Example 28: The method as described in Example 21, wherein the mathematical operation is a subtraction operation that determines a wavelength difference between two resonant wavelengths of the at least two resonant wavelengths, the method further comprising identifying two modes of the optical resonator based on the wavelength difference, wherein the two modes of the optical resonator are respectively associated with the two resonant wavelengths.

Example 29: The method as described in Example 28, further comprising determining two intermediate temperature indications based on the two modes of the optical resonator and respective mappings of the two resonant wavelengths to the two intermediate temperature indications for the optical resonator in the two modes, wherein the temperature of the optical resonator is determined based on a second mathematical operation on the at least two intermediate temperature indications.

Example 30: The method as described in Example 29, wherein the second mathematical operation is a mean operation that produces a mean of the two intermediate temperature indications.

Example 31: The method as described in Example 29, further comprising obtaining two characteristic relationships based respectively on the two modes of the optical resonator, each characteristic relationship indicating a range of resonant wavelengths of the optical resonator relative to a range of temperatures of the optical resonator in a respective mode of the two modes, wherein the two characteristic relationships provide the respective mappings of the two resonant wavelengths to the two intermediate temperature indications for the optical resonator in the two modes.

Example 32: A temperature measurement system, comprising an optical resonator in which light resonates at resonant wavelengths that vary relative to a temperature of the optical resonator; a detector, coupled to the optical resonator and configured to detect at least two resonant wavelengths of light output from the optical resonator; and a computing subsystem, coupled to the detector and configured to determine the temperature of the optical resonator based at least in part on a mathematical operation on the at least two resonant wavelengths of the light output from the optical resonator.

Example 33: The temperature measurement system as described in Example 32, wherein the mathematical operation is a subtraction operation that determines a wavelength difference between two resonant wavelengths of the at least two resonant wavelengths, and the computing subsystem is configured to determine the temperature of the optical resonator based on a mapping of the wavelength difference to the temperature of the optical resonator.

Example 34: The temperature measurement system as described in Example 32, wherein the mathematical operation is a subtraction operation that determines a wavelength difference between two resonant wavelengths of the at least two resonant wavelengths, and the computing subsystem is configured to identify a mode of the optical resonator based on the wavelength difference, wherein the mode of the optical resonator is associated with a resonant wavelength of the two resonant wavelengths; and determine the temperature of the optical resonator based on the mode of the optical resonator and a mapping of the resonant wavelength to the temperature of the optical resonator in the mode.

Example 35: The temperature measurement system as described in Example 34, further comprising a memory coupled to the computing subsystem, wherein the computing subsystem is configured to obtain, from the memory, based on the mode of the optical resonator, a characteristic relationship indicative of a range of resonant wavelengths of the optical resonator relative to a range of temperatures of the optical resonator in the mode, wherein the characteristic relationship provides the mapping of the resonant wavelength to the temperature of the optical resonator in the mode.

Example 36: The temperature measurement system as described in Example 32, wherein the detector is configured to detect two resonant wavelengths that are adjacent to each other in a series of resonant wavelengths of the optical resonator.

Example 37: The temperature measurement system as described in Example 32, wherein the detector is configured to detect two resonant wavelengths that are not adjacent to each other in a series of resonant wavelengths of the optical resonator.

Example 38: The temperature measurement system as described in Example 32, wherein the mathematical operation is a subtraction operation that determines a wavelength difference between two resonant wavelengths of the at least two resonant wavelengths, and the computing subsystem is configured to identify two modes of the optical resonator based on the wavelength difference, wherein the two modes of the optical resonator are respectively associated with the two resonant wavelengths.

Example 39: The temperature measurement system as described in Example 38, wherein the computing subsystem is configured to determine two intermediate temperature indications based on the two modes of the optical resonator and respective mappings of the two resonant wavelengths to the two intermediate temperature indications for the optical resonator in the two modes; and determine the temperature of the optical resonator based on a second mathematical operation on the at least two intermediate temperature indications.

Example 40: The temperature measurement system as described in Example 39, further comprising a memory coupled to the computing subsystem, wherein the computing subsystem is configured to obtain, from the memory, two characteristic relationships based respectively on the two modes of the optical resonator, each characteristic relationship indicating a range of resonant wavelengths of the optical resonator relative to a range of temperatures of the optical resonator in a respective mode of the two modes, wherein the two characteristic relationships provide the respective mappings of the two resonant wavelengths to the two intermediate temperature indications for the optical resonator in the two modes.

For the purposes of the present disclosure, unless otherwise indicated, the phrase "A and B" is nonlimiting and means one or more of (A) and one or more of (B); the phrase "A or B" is nonexclusive and means one or more of (A), one or more of (B), or one or more of (A and B); the phrase "A and/or B" means one or more of (A), one or more of (B), or one or more of (A and B); the phrase "at least one of A and B" and the phrase "one or more of A and B" both mean one or more of (A) and one or more of (B); and the phrase "at least one of A or B" and the phrase "one or more of A or B" both mean one or more of (A), one or more of (B), or one or more of (A and B). By way of extension, for example, the phrases "at least one of A, B, or C" and "one or more of A, B, or C" both mean one or more of (A), one or more of (B), one or more of (C), one or more of (A and B), one or more of (A and C), one or more of (B and C), or one or more of (A, B and C). In the above, A, B, and C represent any form or type of element, feature, arrangement, component, structure, aspect, action, step, etc.

It should be understood that the various embodiments and examples described above can be combined in any combination to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for temperature measurement, comprising:
receiving output light from an optical resonator operating at a temperature;
while the optical resonator is operating at the temperature, detecting at least two resonant wavelengths in the output light, wherein the at least two resonant wavelengths vary relative to the temperature of the optical resonator; and determining the temperature of the optical resonator based at least in part on a mathematical operation that uses the at least two resonant wavelengths detected in the output light.

2. The method of claim 1, wherein the detecting at least two resonant wavelengths includes detecting at least two peaks in an optical intensity or optical power of the output light from the optical resonator.

3. The method of claim 1, wherein the mathematical operation is a subtraction operation that determines a wavelength difference between two resonant wavelengths of the at least two resonant wavelengths, and the temperature of the optical resonator is determined based on a mapping of the wavelength difference to the temperature of the optical resonator.

4. The method of claim 1, wherein the mathematical operation is a subtraction operation that determines a wavelength difference between two resonant wavelengths of the at least two resonant wavelengths, the method further comprising:

identifying a mode of the optical resonator based on the wavelength difference, wherein the mode of the optical resonator is associated with a resonant wavelength of the two resonant wavelengths, and the temperature of the optical resonator is determined based on the mode of the optical resonator and a mapping of the resonant wavelength to the temperature of the optical resonator in the mode.

5. The method of claim 4, further comprising:

obtaining, based on the mode of the optical resonator, a characteristic relationship indicative of a range of resonant wavelengths of the optical resonator relative to a range of temperatures of the optical resonator in the mode, wherein the characteristic relationship provides the mapping of the resonant wavelength to the temperature of the optical resonator in the mode.

6. The method of claim 1, wherein the detecting at least two resonant wavelengths includes detecting two resonant wavelengths that are adjacent to each other in a series of resonant wavelengths of the optical resonator.

7. The method of claim 1, wherein the detecting at least two resonant wavelengths includes detecting two resonant wavelengths that are not adjacent to each other in a series of resonant wavelengths of the optical resonator.

8. The method of claim 1, wherein the mathematical operation is a subtraction operation that determines a wavelength difference between two resonant wavelengths of the at least two resonant wavelengths, the method further comprising:

identifying two modes of the optical resonator based on the wavelength difference, wherein the two modes of the optical resonator are respectively associated with the two resonant wavelengths.

9. The method of claim 8, further comprising:

determining two intermediate temperature indications based on the two modes of the optical resonator and respective mappings of the two resonant wavelengths to the two intermediate temperature indications for the optical resonator in the two modes, wherein the temperature of the optical resonator is determined based on a second mathematical operation on the at least two intermediate temperature indications.

10. The method of claim 9, wherein the second mathematical operation is a mean operation that produces a mean of the two intermediate temperature indications.

11. The method of claim 9, further comprising:

obtaining two characteristic relationships based respectively on the two modes of the optical resonator, each characteristic relationship indicating a range of resonant wavelengths of the optical resonator relative to a range of temperatures of the optical resonator in a respective mode of the two modes, wherein the two characteristic relationships provide the respective mappings of the two resonant wavelengths to the two intermediate temperature indications for the optical resonator in the two modes.

12. A temperature measurement system, comprising:

an optical resonator in which light resonates at resonant wavelengths, wherein the resonant wavelengths vary relative to a temperature of the optical resonator;

a detector, coupled to the optical resonator and configured to receive output light that is output from the optical resonator, and while the optical resonator is operating at the temperature, the detector is configured to detect at least two resonant wavelengths in the output light received from the optical resonator; and a computing subsystem, coupled to the detector and configured to determine the temperature of the optical resonator based at least in part on a mathematical operation that uses the at least two resonant wavelengths detected in the output light received from the optical resonator.

13. The temperature measurement system of claim 12, wherein the mathematical operation is a subtraction operation that determines a wavelength difference between two resonant wavelengths of the at least two resonant wavelengths, and the computing subsystem is configured to:

determine the temperature of the optical resonator based on a mapping of the wavelength difference to the temperature of the optical resonator.

14. The temperature measurement system of claim 12, wherein the mathematical operation is a subtraction operation that determines a wavelength difference between two resonant wavelengths of the at least two resonant wavelengths, and the computing subsystem is configured to:

identify a mode of the optical resonator based on the wavelength difference, wherein the mode of the optical resonator is associated with a resonant wavelength of the two resonant wavelengths; and determine the temperature of the optical resonator based on the mode of the optical resonator and a mapping of the resonant wavelength to the temperature of the optical resonator in the mode.

15. The temperature measurement system of claim 14, further comprising a memory coupled to the computing subsystem, wherein the computing subsystem is configured to:

obtain, from the memory, based on the mode of the optical resonator, a characteristic relationship indicative of a range of resonant wavelengths of the optical resonator relative to a range of temperatures of the optical resonator in the mode, wherein the characteristic relationship provides the mapping of the resonant wavelength to the temperature of the optical resonator in the mode.

16. The temperature measurement system of claim 12, wherein the detector is configured to detect two resonant wavelengths that are adjacent to each other in a series of resonant wavelengths of the optical resonator.

17. The temperature measurement system of claim 12, wherein the detector is configured to detect two resonant wavelengths that are not adjacent to each other in a series of resonant wavelengths of the optical resonator.

18. The temperature measurement system of claim 12, wherein the mathematical operation is a subtraction operation that determines a wavelength difference between two resonant wavelengths of the at least two resonant wavelengths, and the computing subsystem is configured to:

identify two modes of the optical resonator based on the wavelength difference, wherein the two modes of the optical resonator are respectively associated with the two resonant wavelengths.

19. The temperature measurement system of claim 18, wherein the computing subsystem is configured to:

determine two intermediate temperature indications based on the two modes of the optical resonator and respective mappings of the two resonant wavelengths to the two intermediate temperature indications for the optical resonator in the two modes; and determine the temperature of the optical resonator based on a second mathematical operation on the at least two intermediate temperature indications.

20. The temperature measurement system of claim 19, further comprising a memory coupled to the computing subsystem, wherein the computing subsystem is configured to:

obtain, from the memory, two characteristic relationships based respectively on the two modes of the optical resonator, each characteristic relationship indicating a range of resonant wavelengths of the optical resonator relative to a range of temperatures of the optical resonator in a respective mode of the two modes, wherein the two characteristic relationships provide the respective mappings of the two resonant wavelengths to the two intermediate temperature indications for the optical resonator in the two modes.

\*    \*    \*    \*    \*